(12) United States Patent
Khajehoddin et al.

(10) Patent No.: US 11,714,934 B2
(45) Date of Patent: Aug. 1, 2023

(54) AGGREGATED MODEL OF LARGE-SCALE WIND FARMS FOR POWER SYSTEM SIMULATION SOFTWARE TOOLS

(71) Applicant: The Governors of the University of Alberta, Edmonton (CA)

(72) Inventors: Sayed Ali Khajehoddin, Edmonton (CA); Ahmadreza Tabesh, Edmonton (CA); Navid Shabanikia, Edmonton (CA)

(73) Assignee: The Governors of the University of Alberta, Edmonton (CA)

( * ) Notice: Subject to any disclaimer, the term of this patent is extended or adjusted under 35 U.S.C. 154(b) by 94 days.

(21) Appl. No.: 16/904,959

(22) Filed: Jun. 18, 2020

(65) Prior Publication Data

US 2020/0401740 A1 Dec. 24, 2020

Related U.S. Application Data

(60) Provisional application No. 62/862,816, filed on Jun. 18, 2019.

(51) Int. Cl.
*G06F 30/20* (2020.01)
*F03D 9/25* (2016.01)
*G06F 113/06* (2020.01)
(52) U.S. Cl.
CPC ............. *G06F 30/20* (2020.01); *F03D 9/257* (2017.02); *G06F 2113/06* (2020.01)

(58) Field of Classification Search
CPC ...... F03D 9/257; G06F 30/20; G06F 2113/06; G06F 2119/06; Y02E 10/72; Y02E 60/00; F05B 2260/84; Y04S 40/20
See application file for complete search history.

(56) References Cited

U.S. PATENT DOCUMENTS

| | | | | |
|---|---|---|---|---|
| 9,328,718 | B2 * | 5/2016 | Nielsen | F03D 7/048 |
| 2015/0167631 | A1 * | 6/2015 | Prindle | H02K 7/1838 |
| | | | | 290/55 |
| 2015/0278405 | A1 * | 10/2015 | Andersen | G06Q 10/04 |
| | | | | 703/18 |
| 2016/0215759 | A1 * | 7/2016 | Fleming | F03D 7/046 |
| 2017/0284375 | A1 * | 10/2017 | Nielsen | F03D 7/00 |

OTHER PUBLICATIONS

Qaio "Dynamic Modeling of Wind Farms with Fixed-Speed Wind Turbine Generators" Jun. 2007 IEEE Xplore pp. 1-8.*

* cited by examiner

*Primary Examiner* — Charles E Anya
(74) *Attorney, Agent, or Firm* — MaxGoLaw PLLC

(57) ABSTRACT

A method of modeling an equivalent wind turbine generator (WTG) system for a wind farm having a plurality of WTG units includes determining an impact factor of each WTG unit of the plurality of WTG units, determining an equivalent single WTG unit model parameters of the wind farm based on the impact factor of each WTG unit, and determining an effective wind speed of the wind farm to use as the equivalent WTG input wind speed. The method produces a model of static and/or dynamic wind farm behavior. Additionally, a software configured to execute a method of modeling an equivalent wind turbine generator (WTG) system for a wind farm having a plurality of WTG units.

17 Claims, 23 Drawing Sheets

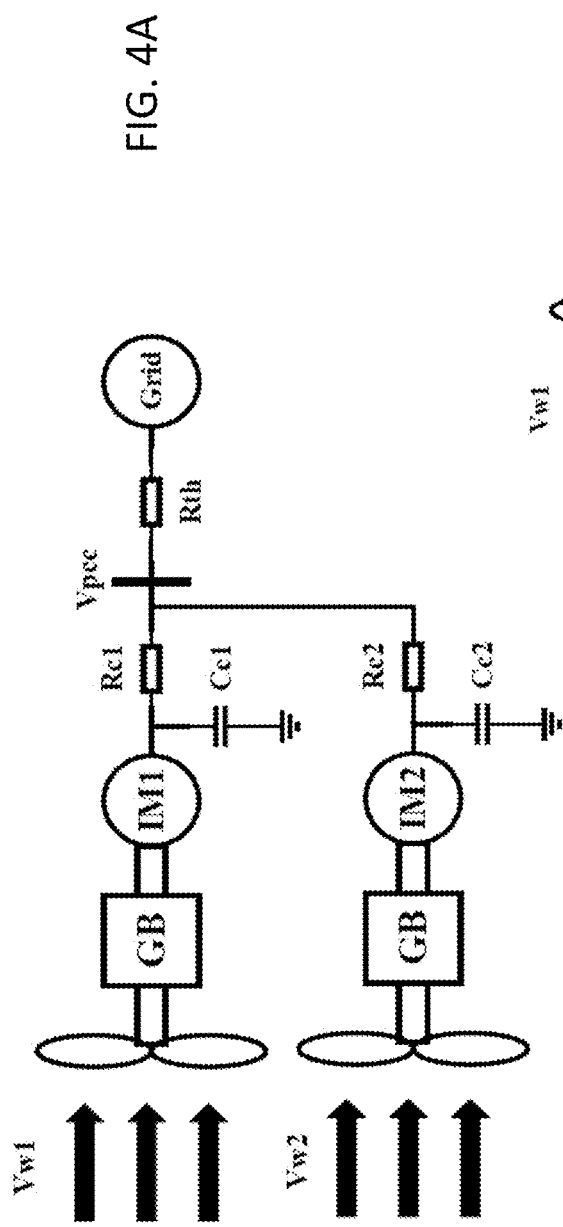
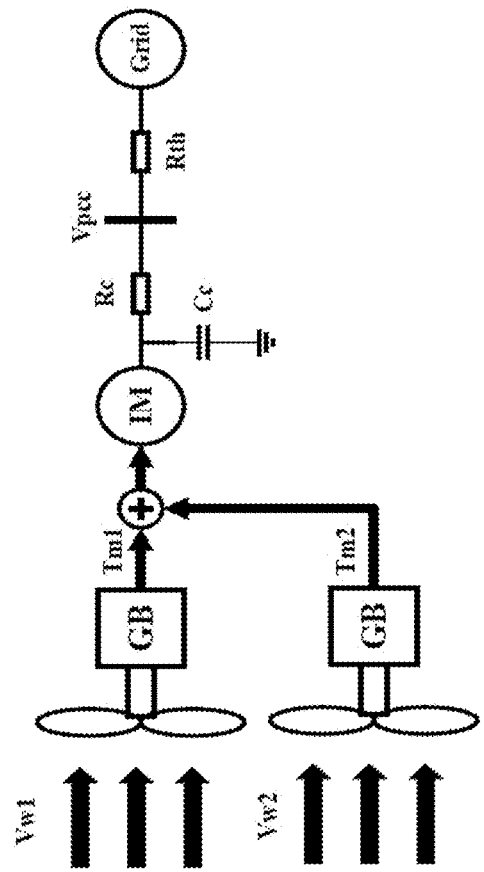
FIG. 4A
FIG. 4B

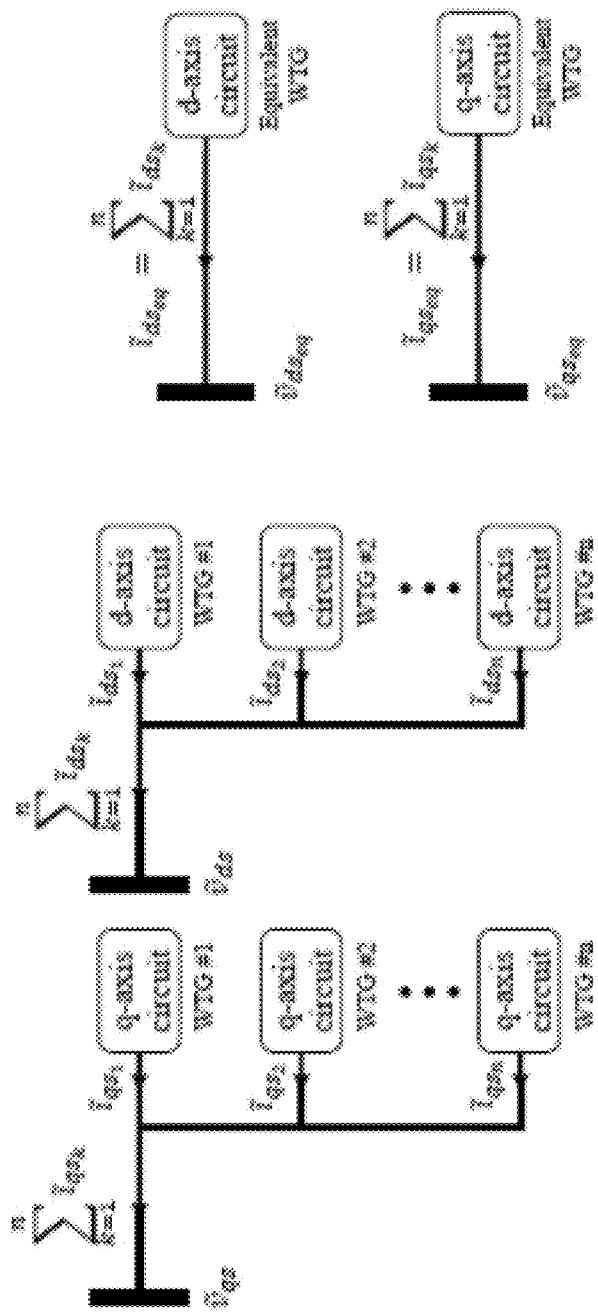

AGGREGATED MODEL OF LARGE-SCALE WIND FARMS FOR POWER SYSTEM SIMULATION SOFTWARE TOOLS

RELATED APPLICATIONS

This application claims priority benefit of U.S. Provisional Application Ser. No. 62/862,816 filed on Jun. 18, 2019, the contents of which are hereby incorporated by reference.

FIELD OF THE INVENTION

The present invention generally relates to power system application and simulation software, and more specifically to power system analysis and simulation software for large-scale wind farms. By considering the impact factor and contribution of each of hundreds of wind turbine-generator units, a device or simulation software can be developed to have similar behavior of the large-scale wind farm as seen by a power grid from the point of common coupling.

BACKGROUND

Large-scale wind farms may consist of different types of wind turbine-generator (WTG) units including fixed-speed, doubly-fed induction generator, and permanent magnet synchronous generators. By increasing the penetration of large-scale wind farms into power systems, various aggregation methods are proposed to model a large-scale wind farm with an equivalent system for steady-state and dynamic analyses. An aggregation method for modeling of a large-scale wind farm reduces the computational burden of steady-state and dynamic analysis. A suitable model should be computationally efficient and adequately accurate for steady-state and dynamic behavior of the system under different operating conditions. Such a model should be easily used in steady-state and dynamic analyses.

A wind farm aggregated model is a reduced order system or an equivalent WTG unit that describes the electrical behavior of the wind farm seen from the point of common coupling to the grid. Such a model radically reduces the computational burdens and complexity in power system analysis that includes wind farms with hundreds of wind turbine generator (WTG) units. Rapid increase of large-scale wind farm installations necessitates to develop aggregated models for power system analysis. However, there is a trade-off between the accuracy of the aggregated model and its complexity that determines the performance and accuracy of the wind farm equivalent models.

Full, Zone, and Semi Aggregation (Agg.) methods are conventionally proposed to model WTGs in a wind farm by one or a few equivalent WTG units. Full Agg. method per-unitizes a WTG unit using its rated power as a base and then simply changes the base power to the rating of wind farm to develop the Full Agg. model for wind farm. This method assumes that the operating points and parameters of all WTGs are the same and a uniform wind speed distribution throughout the wind farm. This assumption is not valid for a real wind farm and can cause inaccuracy in dynamic and steady state analyses.

Zone Agg. uses the concept of Full Agg. method, however, it partitions the wind farm into several zones (clusters) with respect to various wind speed. Wang et al in develop an advanced time series wind turbines clustering method, based on a geometric template matching, to improve the accuracy of the Zone Agg. method. Also, an aggregated turbine and network impedance model has been presented in, in which a new sequence impedance model is developed for resonance analysis of wind farms. Zone aggregation increases the equivalent model accuracy at the cost of higher complexity that makes the model computationally inefficient for large-scale wind farms. Semi Agg. method replaces the wind farm generators by a single per unitized generator, however, it keeps the mechanical parts of WTGs intact. Semi Agg. method provides a relatively accurate method, however, it is also inefficient for large-scale wind farms since it models mechanical parts of hundreds of WTGs in details. Thus, challenges in developing an aggregated model of wind farms include the different wind speed zones in a large wind farm and different parameters of WTGs in a wind farm. These challenges have not been adequately addressed in existing aggregation methods.

Full aggregation, Zone aggregation, and Semi aggregation methods are conventional methods to aggregate wind farms. The Full aggregation method replaces WTGs in a wind farm by one WTG with averaging the WTGs parameters and assuming similar wind speed inputs. However, different wind speed zones and/or various machine parameters significantly increase the inaccuracy of the Full aggregation method. The Zone aggregation method uses zoning of the wind farm by their wind speed inputs and then aggregates every zone with the Full aggregation method. This significantly increases the accuracy of the aggregated model at the cost of higher complexity of the model which can be inefficient for large-scale wind farms. The Semi aggregation method replaces wind farm generators by one generator with averaging the parameters of generators, however, it keeps the mechanical part of WTGs intact. The Semi aggregation method provides an accurate method; however, it is also inefficient in large-scale wind farms since it needs to model all mechanical parts of WTG in details.

Accordingly, there is a need for an aggregated model of wind farms that is highly accurate while being efficient and low-cost for large-scale wind farms. More specifically, there is a need for an aggregation model that is capable of quantifying the contribution of each WTG in a large-scale wind farm.

SUMMARY OF THE INVENTION

The present invention provides a method of modeling an equivalent wind turbine generator (WTG) system for a wind farm having a plurality of WTG units. The method includes determining an impact factor of each WTG unit of the plurality of WTG units, determining an equivalent single WTG unit model parameters of the wind farm based on the impact factor of each WTG unit, and determining an effective wind speed of the wind farm to use as the equivalent WTG input wind speed. The method produces a model of static and/or dynamic wind farm behavior. Additionally, a software system is provided that is configured to execute an inventive method of modeling an equivalent wind turbine generator (WTG) system for a wind farm having a plurality of WTG units.

BRIEF DESCRIPTION OF THE DRAWINGS

The present invention is further detailed with respect to the following drawings that are intended to show certain aspects of the present of invention, but should not be construed as limit on the practice of the invention, wherein:

FIG. 4A shows a schematic of a two fixed-speed WTG wind farm having a collector system with capacitors to provide reactive power;

FIG. 4B shows a schematic of a semi aggregated two fixed-speed WTG wind farm having a collector system with capacitors to provide reactive power;

FIG. 11A are windfarm d-q axis circuits and FIG. 10B are equivalent model d-q axis circuits

DETAILED DESCRIPTION OF THE INVENTION

Figure 1:
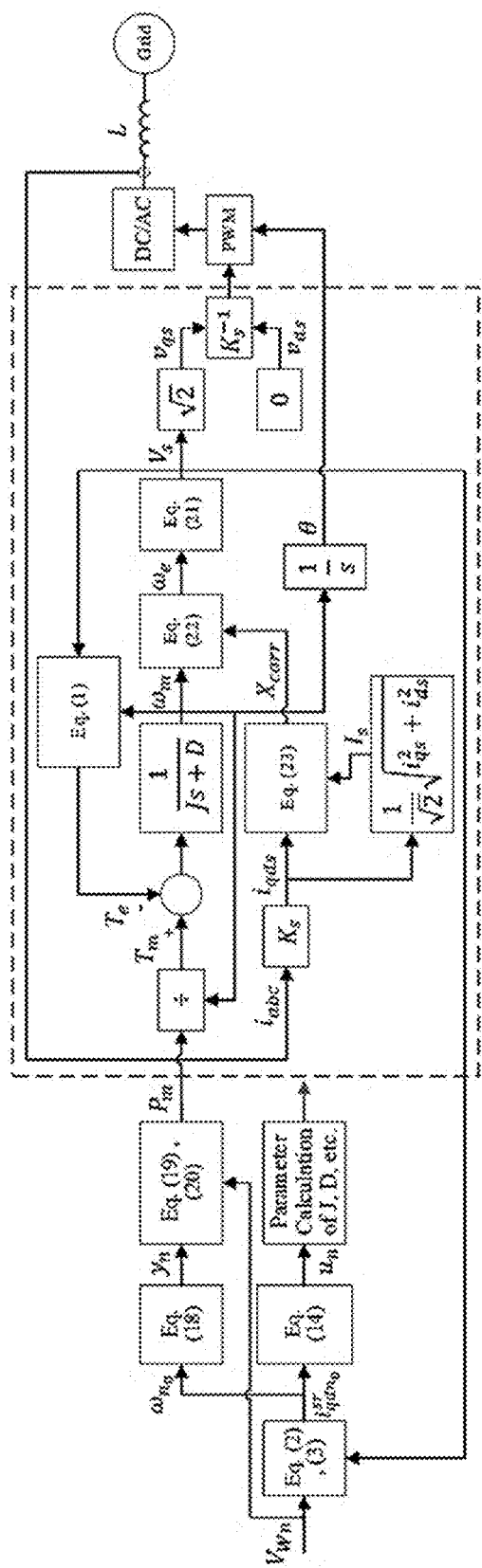
FIG. 1 shows a virtual wind farm based on an Asynchronous machine according to forms of the present disclosure.

The present invention has utility as a method for aggregately modeling a wind farm capable of quantifying the contribution of each WTG in a large-scale wind farm and as a power system simulation software for large-scale wind farms for considering the impact factor and contribution of each of hundreds of wind turbine-generator units making up the large-scale wind farm as seen by a power grid from the point of common coupling. The method of the present invention is highly accurate while being efficient and low-cost for large-scale wind farms.

The present invention provides an Impact Factor aggregation (I.F. Agg.) method that includes the contribution of each WTG unit, based on its parameters and operating point, within the equivalent model of wind farm. The method provides a computationally efficient model for a wind farm that significantly improves the accuracy compared with Full Agg. method. The reason is that I.F. Agg. method includes the effects of WTGs with different parameters and/or operating points. The inventive I.F. Agg. method analytically calculates the contribution of each WTG unit as a weight function in frequency domain. This technique allows one to determine the best set of equivalent model parameters to improve the model accuracy over the frequency range of interest. Most of existing methods develop and test the performance of their aggregated models mainly for fixed-speed wind farms to explain the main concept of the methods for the simplest wind farm configuration. Furthermore, the inventive method includes the effect of wind farm collector system in the equivalent model that is less considered and discussed in the other existing methods.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

According to embodiments, the software element can be used for both steady-state and dynamic analyses of power systems including large-scale wind farms. The system significantly reduces the computational burden of a computer and its memory usage for power system simulation by replacing a large-scale wind farm including hundreds of wind turbine-generator units with an equivalent functional model. Compared to the existing aggregated models, the inventive functional model according to embodiments of the present invention supports a wind farm with different wind speed zones. It also supports modeling of a wind farm with different ratings of wind turbine generator units Embodiments of present invention utilize Impact Factors (I.F.) of a WTG in a wind farm to quantify the contribution of each WTG in an aggregation model. According to embodiments, the I.F. aggregation method uses the frequency response technique to find the best match between the aggregated model parameters and wind farm based on d-q reference frame model of the wind farm generators. Using the I.F. concept results in the model having least amount of error and simulation time overall compared to Full aggregation, Zone aggregation and Semi aggregation methods for both steady-state and transient analyses. According to embodiments, the performance of the method is evaluated based on time-domain simulation of fixed-speed wind farm including 80 WTGs. The time-domain investigation compares the simulation results for the aggregation of the wind farm by Full aggregation, Zone aggregation, Semi aggregation and I.F. aggregation methods under four different scenarios. These test scenarios cover the combinations of various wind speed inputs and different WTGs parameters in the wind farm test system.

Furthermore, the inventive method includes the effect of wind farm collector system in the equivalent model that is less considered and discussed in the other existing methods. According to embodiments of the I.F. Agg. method, a wind farm including 80 WTGs is fully modeled using MATLAB/SIMULINK software tool. The time domain dynamic and steady state behavior of this wind farm is obtained and used as a reference to evaluate and compare different aggregation methods. Various test scenarios are defined including a combination WTGs with similar/different parameters and a wind farm with uniform/nonuniform wind speed distributions. The present invention also defines a normalized index to quantify computational burden, and accuracy to present superior features of the inventive I.F. Agg. method compared with the other methods.

Figure 3A:
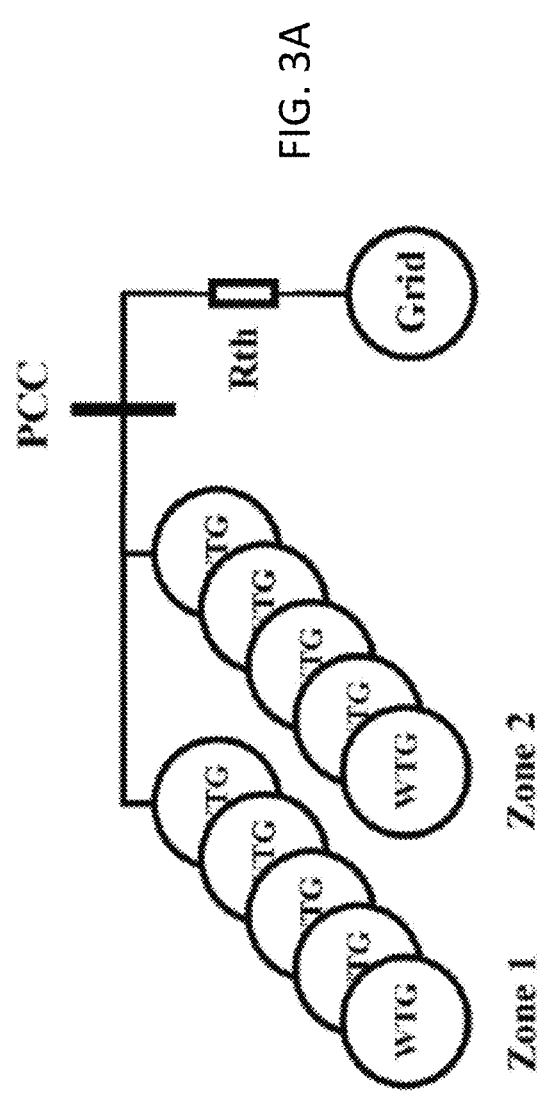
FIG. 3A shows a schematic drawing of a two-zone wind farm according to embodiments of the present invention.
Figure 3B:
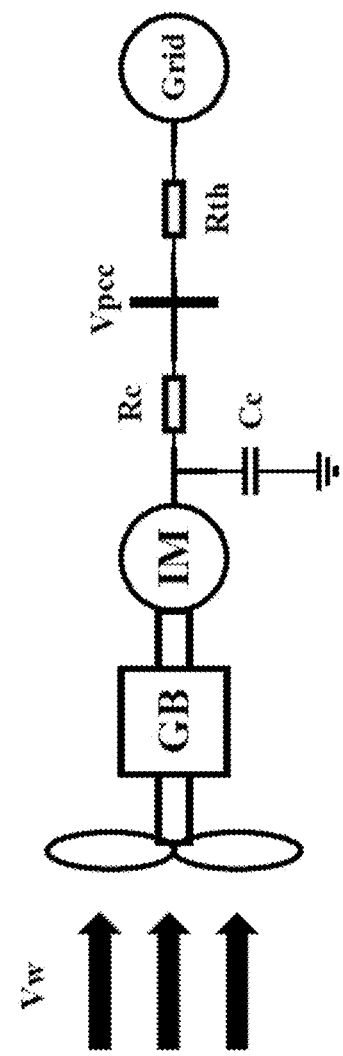
FIG. 3B shows a schematic diagram of a fixed-speed wind turbine generator having a collector system with capacitors to provide reactive power.

FIG. 3A shows the diagram of a wind farm including tens of fixed-speed WTG units that are connected to a grid at the point of common coupling (PCC) through a collector system. In a large-scale wind farm, the wind speed distribution at WTG units is not necessarily uniform. To improve the accuracy, the wind farm can be partitioned in zones as shown in FIG. 3A. In partitioning of a large-scale wind farm, in addition to wind speed, several operating point parameters such as slip ratio, and active power must be used in a clustering algorithm. A fixed speed wind farm includes several WTG units with a given schematic as shown in FIG. 3B. The aerodynamic model of the turbine is shown in Equation 1.

$$P_m = C_p(\lambda,\beta)P_W = T_m \omega_r \qquad \text{Equation 1:}$$

where $P_W = 0.5\rho\pi r^2 V_W^3$ is the wind power. The parameters $\rho$, r, and $V_W$ denote the air density, turbine radius, and the wind speed, respectively. $C_p(\lambda,\beta)$ is the turbine coefficient that is a function of the pitch angle of the turbine blades, $\beta$, and the tip speed ratio, $\lambda \triangleq r\omega_l/V_W$, where $w_l$ is the turbine shaft speed. $P_m$, $T_m$, and $w_r$ are the generator mechanical power, torque, and speed, respectively. For a given pitch angle, $C_p$ can be estimated with a quadratic function as Equation 2.

$$C_p(\lambda) = \frac{C_{pm}}{\lambda_{opt}^2}(2\lambda_{opt} - \lambda)\lambda, \qquad \text{Equation 2}$$

where $C_{pm}$ is the maximum of Cp that occurs at $\lambda=\lambda_{opt}$. The turbine coefficient in Equation 2 can be referred to generator shaft in Equation 3.

$$C_p(\lambda') = \frac{C_{pm}}{\lambda_{opt}'^2}(2\lambda_{opt}' - \lambda')\lambda', \qquad \text{Equation 3}$$

where the referred parameters are $\lambda'=rw_r/V_W=G\lambda$ and $\lambda'_{opt}=G\lambda_{opt}$, and $G_-=w_r/w_l$ is gear box turns ratio in a WTG. Using this notation, the steady-state model of WTG at the generator side is shown in Equation 4.

$$T_m + T_e = D\omega_r/\omega_b, \qquad \text{Equation 4:}$$

where $T_e = (X_m^2 R_r s_0 V_s)/\Delta_{T_e}$, is the generator electric torque, $w_b$ is the based frequency, D is mechanical damping coefficient, and $$\Delta T_e = [R_s R_r + s_0(X_m^2 - X_{ss}X_{rr})]^2 + [R_r X_{ss} + s_0 R_s X_{rr}]^2.$$

Vs is the effective voltage at PCC, $R_s$ and $R_r$ are the stator and rotor resistances, and $X_m$ is the magnetizing reactance, respectively. The slip of induction generator at the operating point is $s_0=(w_b-w_r)/w_b$ and the machine reactances are $X_{ss}=X_m+X_{ls}$ and $X_{rr}=X_m+X_{lr}$ where $X_{ls}$ and $X_{lr}$ are leakage reactances of stator and rotor, respectively.

The schematics of equivalent system corresponding to Full Agg. method is depicted on FIG. 3B, in which the wind farm is replaced with a single unit WTG assuming that the WTG parameters and wind speed of all zones (zone I and 2 in FIG. 3A) are the same for all n WTG units within the farm. Based on these assumptions, the per unitized parameters of the generator in Full Agg. model is the same as that of calculated for a single WTG unit in section A, provided that $S_{beq}=nS_b$ is used as the base power where $S_b$ is the rated power of WTGs and $S_{beq}$ is the rated power of the wind farm.

Two limitations of the Full Agg. model are ambiguities in the definition of mechanical parameters and modeling of real wind farms including machines with different ratings and various wind speeds within the zones. It has previously been proposed that the total mechanical power of the wind farm is calculated and applied to the equivalent generator without considering a model for wind turbine. The variable wind speed at different zones causes steady-state and dynamic errors when aggregated model for a large-scale wind farm is used. To mitigate the error of wind speed mismatch at different zone, the concept of equivalent effective wind speed of wind farm with unison WTGs is defined as Equation 5.

$$V_W = \frac{1}{n}\left(\sum_{k=1}^{n} V_{W_k}^3\right)^{\frac{1}{3}}, \qquad \text{Equation 5}$$

where $V_W$ is the wind speed that provides a power equals to the total power of wind farm.

Figure 2:
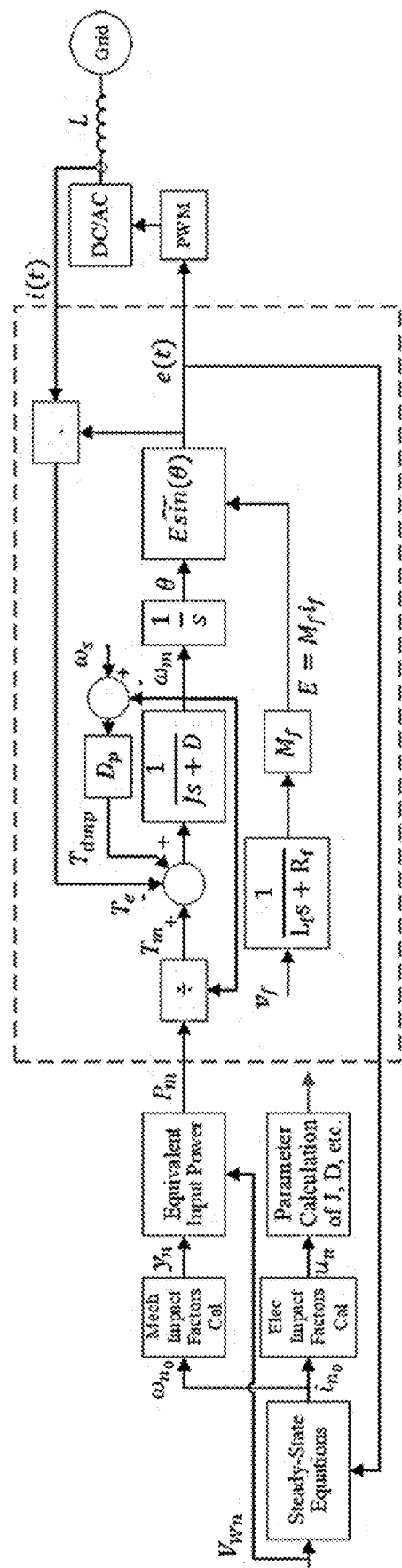
FIG. 2 shows a virtual wind farm based on a Synchronous machine according to forms of the present disclosure.

Zone Agg. method partitions the wind farm into a few zones with respect to wind speed variations, and other operating point parameters of WTG units. Then, a Full Agg. model is associated to each zone to represent WTGs within the zone with an equivalent system as shown in FIG. 2(a). This method significantly improves the accuracy of equivalent models since each Full Agg. model is assigned to a zone with an almost fixed wind speed. However, improving the accuracy in this method is obtained at the cost of model complexity since the number of zones may be high in large-scale wind farms. Furthermore, the other limitations of Full Agg. method, including the inability to model WTGs with different parameters, will be directly induced to the Zone Agg. method.

To further improve the aggregated model accuracy, Semi Agg. method is proposed, in which the wind farm generators are represented with a single per unitized generator similar to the one in Full Agg. method. However, the wind turbines are individually modeled to calculate mechanical torque separately, as depicted on FIG. 4B. This method keeps the mechanical part of wind farm intact and only the generators are aggregated. Therefore, the method will become computationally inefficient for large-scale wind farms although it provides more accurate results compared with Full and Zone Agg. methods.

The inventive I.F. Agg. method quantifies the impact of each WTG within a wind farm to develop a more accurate equivalent system for the wind farm. This method introduces an equivalent WTG unit for the wind farm and determines its parameters based on weighted average of the WTGs within the farm. The weighting function is defined as the incremental ratio of WTG current to the wind farm current at PCC.

The weighted averaging technique can be analytically realized in frequency domain that needs the full model of WTG to be linearized about its operating point. Then, the technique will be used for WTG models in frequency domain to obtain the equivalent model parameters. An advantage of using I.F. Agg. method is that it can also define an equivalent RC model for the collector system of the wind farm. It will be shown that the weighted averaging technique significantly improves the accuracy of aggregation model while it remains computationally efficient and addresses the limitation of existing methods.

The first step of I.F. method needs to determine the operating point of WTG units. Based on Equation 1, the input mechanical power corresponding to the k-th WTG unit is $$P_{m_{k_0}} = C_{p_k}(\lambda'_{k_0}, \beta_{k_0})P_{w_{k_0}}$$

where the subscript "0" signifies quantities at the operating point. For the sake of brevity, subscript k is removed within the rest this section till it is needed for merging the equations. The rated slip of high power induction generators is small (e.g. −0.005 for MW-scale generators), therefore, the mechanical speed of generator shaft can be approximated as $r_{r0}=w_b/p$ where p is the number of pole pair of generator in a WTG. As the dynamic of pitch control system is slow compared with the power system dynamics, the pitch angle $\beta_0$ can be assumed constant corresponding to a fixed wind speed. Thus, $P_{m0}$ is given as $P_{m0}=Cp(\lambda'_0)P_{W0}$ where $\lambda'_0 \approx rw_b/(p \cdot V_w)$. Hence, to obtain the slop at WTG operating point, the per unitized $P_{m0}$ and $w_{r0}=1-s_0$ can be substituted in Equation 4 and solved it for $s_0$.

The next step in I.F. Agg. method is to obtain the impact factors of WTGs that are used for weighted averaging of machine parameters to obtain an equivalent WTG for the wind farm. This averaging can be appropriately performed in frequency domain to cover the frequency range of interest for power system studies. The linearized mechanical model of an squirrel cage induction generator is shown in Equation 6.

$$\Delta T_m = X_m i_{dr0}\Delta i_{qs} - X_m i_{qr0}\Delta i_{ds} - X_m i_{ds0}\Delta i_{qr} + + X_m i_{qs0}\Delta i_{dr} - 2H\frac{d\Delta \omega_r}{dt}. \quad \text{Equation 6}$$

For a WTG and based on Equations 1-3, one obtains Equation 7.

$$\omega_{r0}\Delta T_m + T_{m0}\Delta \omega_r = P_{W_0}\frac{\partial C_p}{\partial \lambda'}\bigg|_{\lambda'=\lambda'_0}\Delta \lambda' + C_{p0}\Delta P_W, \quad \text{Equation 7}$$

where $\Delta \lambda'=r\Delta W_r/V_{w0}$. Solving Equation 7 for $\Delta T_m$ yields Equation 8.

$$\Delta T_m = e_m \Delta \omega_r, \quad \text{Equation 8}$$

-continued $$e_m = \frac{1}{\omega_{r_0}}\left(\frac{\partial C_p}{\partial \lambda'}\bigg|_{\lambda'=\lambda'_0}\frac{rP_{W_0}}{V_{W_0}} - T_{m_0}\right).$$

where.

The linearized voltage equations of the machine in frequency domain are shown in Equations 9-12.

$$\Delta v_{qs} = A_{qs}\Delta i_{qs} + B_{qs}\Delta i_{ds} + C_{qs}\Delta i_{qr} + D_{qs}\Delta i_{dr}, \quad \text{Equation 9}$$

$$\Delta v_{ds} = A_{ds}\Delta i_{qs} + B_{ds}\Delta i_{ds} + C_{ds}\Delta i_{qr} + D_{ds}\Delta i_{dr}, \quad \text{Equation 10}$$

$$\Delta v_{qr} = 0 = A_{qr}\Delta i_{qs} + B_{qr}\Delta i_{ds} + C_{qr}\Delta i_{qr} + D_{qr}\Delta i_{dr}, \quad \text{Equation 11}$$

$$\Delta v_{dr} = 0 = A_{dr}\Delta i_{qs} + B_{dr}\Delta i_{ds} + C_{dr}\Delta i_{qr} + D_{dr}\Delta i_{dr}, \quad \text{Equation 12}$$

$$A_{qs} = B_{ds} = R_s + \frac{j\omega}{\omega_b}X_{ss}, B_{qs} = -A_{ds} = X_{ss},$$

$$C_{qs} = D_{ds} = \frac{j\omega}{\omega_b}X_m, D_{qs} = -C_{ds} = X_m,$$

where and $$A_{qr} = \frac{j\omega}{\omega_b}X_m - X_d i_{dr0}, A_{dr} = -s_0 X_m + X_q i_{dr0},$$

$$B_{qr} = s_0 X_m + X_d i_{qr0}, B_{dr} = \frac{j\omega}{\omega_b}X_m - X_q i_{qr0},$$

$$C_{qr} = R_r + \frac{j\omega}{\omega_b}X_{rr} + X_d i_{ds0}, C_{dr} = -s_0 X_{rr} - X_q i_{ds0},$$

$$D_{qr} = s_0 X_{rr} - X_d i_{qs0}, D_{dr} = R_r + \frac{j\omega}{\omega_b}X_{rr} + X_q i_{qs0}.$$

Solving Equations 11 and 12 for $\Delta i_{qr}$ and $\Delta i_{dr}$ and substituting the solutions in Equations 9 and 10 yield Equations 13 and 14.

$$\Delta v_{qs}=\alpha_q(j\omega)\Delta i_{qs}+\beta_q(j\omega)\Delta i_{ds}, \quad \text{Equation 13:}$$

$$\Delta v_{ds}=\alpha_d(j\omega)\Delta i_{qs}+\beta_d(j\omega)\Delta i_{ds}, \quad \text{Equation 14:}$$

Finally, by solving Equation 14 for $\Delta i_{ds}$ and substituting the solution in Equation 13, $\Delta v_{qsk}$ for the k-th unit can be expressed in terms of two transfer functions $K_k(jw)$ and $G_k(jw)$ as given by Equation 15.

$$\Delta v_{qs_k} = K_k(j\omega)\Delta i_{qs_k} + G_k(j\omega)\Delta v_{ds_k}, \quad \text{Equation 15}$$

where $$K_k(j\omega) = \alpha_{q_k}(j\omega) - \frac{\beta_{q_k}(j\omega)\alpha_{d_k}(j\omega)}{\beta_{d_k}(j\omega)}, G_k(j\omega) = \beta_{q_k}(j\omega)/\beta_{d_k}(j\omega).$$

The WTG units are connected in parallel through a collector system that is often design for negligible power losses (e.g. less than 2%) at rated power of wind farm. Thus, to develop equivalent system of a wind farm including n WTGs, it can be assumed that $v_{qsk} \cong v_{qs}$ and $v_{dsk} \cong v_{ds}$ for k=1, 2, . . . , n where $v_{qs}$ and $v_{ds}$ are dq-components of the wind farm at the point of common coupling. Thus, by applying summation over k=1, 2, . . . , n in Equation 15, the wind farm model in frequency domain can be expressed as Equation 16.

$$n\Delta v_{qs} = \Delta i_{qs} \sum_{k=1}^{n} \frac{K_k(j\omega)\Delta i_{qs_k}}{\Delta i_{qs}} + \Delta v_{ds} \sum_{k=1}^{n} G_k(j\omega),$$

Equation 16

The impact factor is defined as $u_k \triangleq \Delta i_{qsk}/\Delta i_{qs}$ at w=0, i.e. the dc gain of incremental current ratios since w=0 in dq frame corresponding to the fundamental frequency of the generator in time domain. Then, Equation 16 can be expressed as Equation 17.

$$\Delta v_{qs} = \frac{K'(j\omega)}{n}\Delta i_{qs} + \frac{G'(j\omega)}{n}\Delta v_{ds},$$

Equation 17 where $$K'(j\omega) \triangleq \sum_{k=1}^{n} K_k u_k, \quad G'(j\omega) \triangleq \sum_{k=1}^{n} G_k.$$

Finally, by updating the base apparent power to the rating of wind farm, i.e. SWF=nSWTG, Equation 17 can be rearranged in wind farm per unit system as Equation 18.

$$\Delta v_{qs} = K'(j\omega)\Delta i_{qs} + G'(j\omega)\Delta v_{ds},$$

Figure 8:
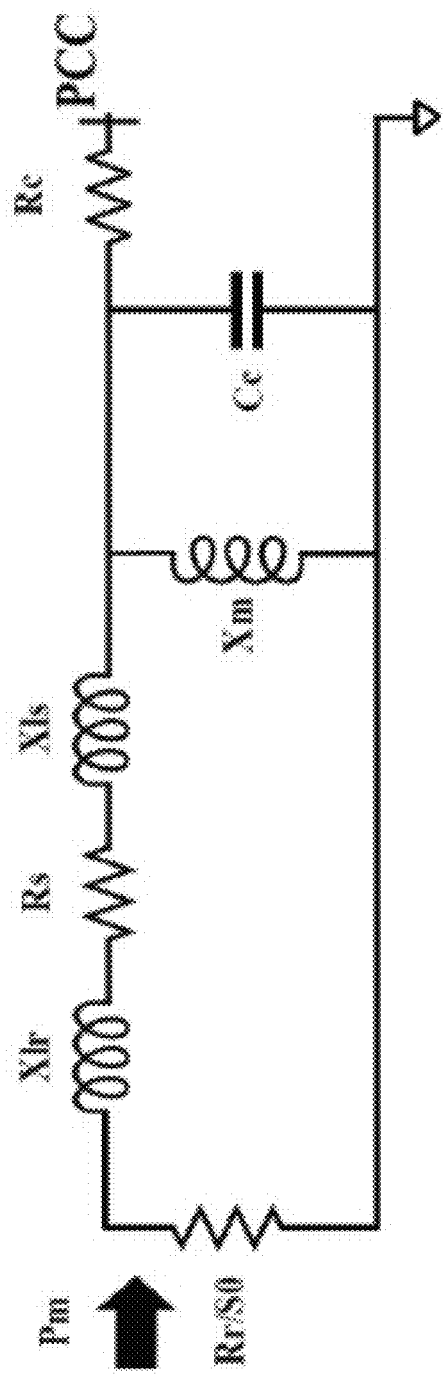
FIG. 8 is an equivalent circuit diagram of the I.F. Agg. Model according to embodiments of the present invention.
Figure 9:
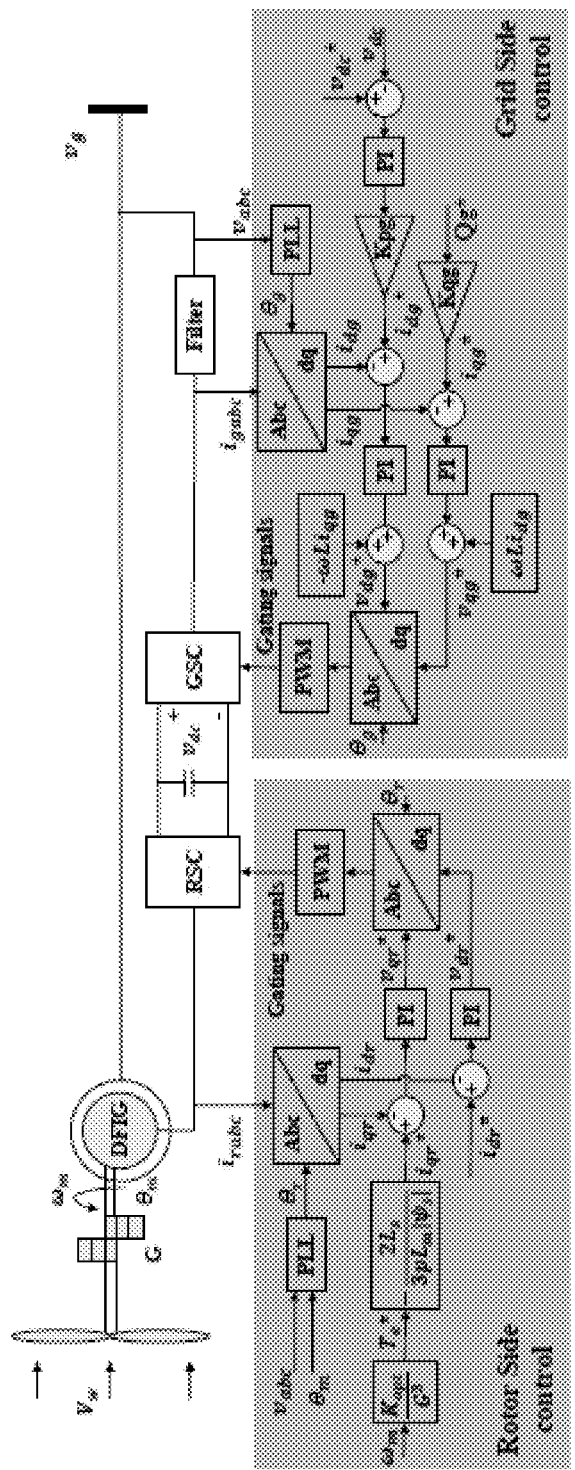
FIG. 9 is Doubly-Fed Induction Generator (DFIG) WTG schematic.
Figure 10B:
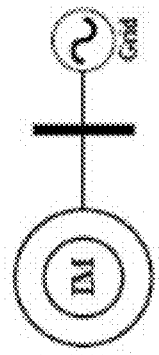
FIG. 10B is Fixed-Speed WTG.
Figure 10A:
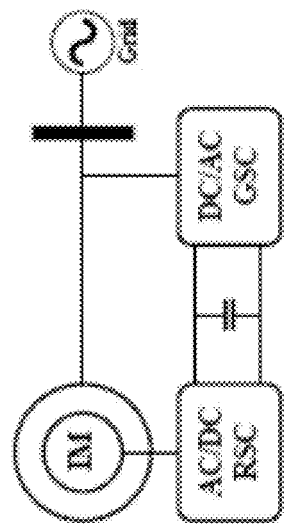
FIG. 10A is DFIG WTG.
Figure 12:
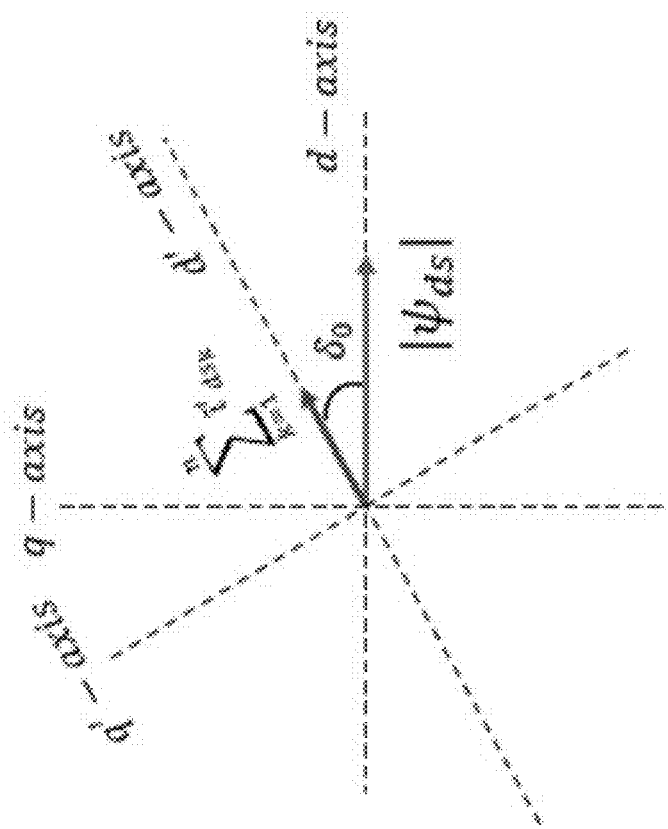
FIG. 12 depicts rotating the d-q frame by 0.
Figure 13:
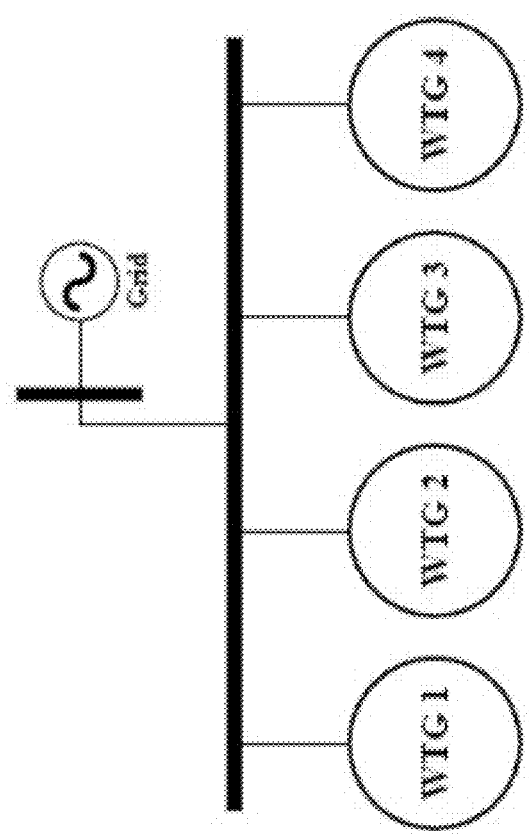
FIG. 13 depicts a 4-WTGs windfarm.
Figure 14:
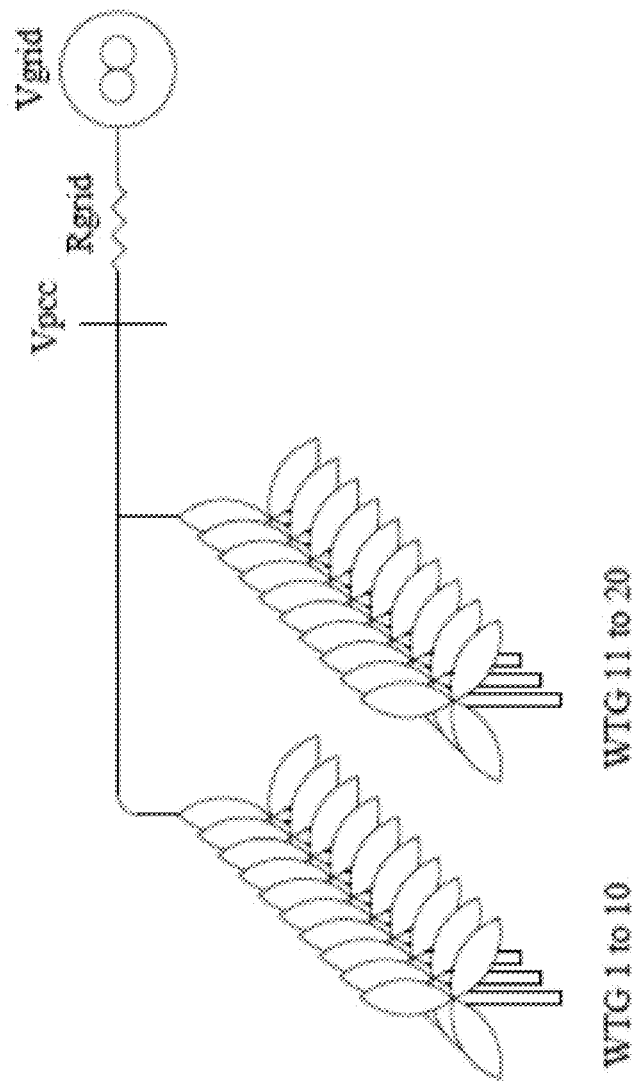
FIG. 14 depicts a 20-WTGs windfarm.
Figure 15:
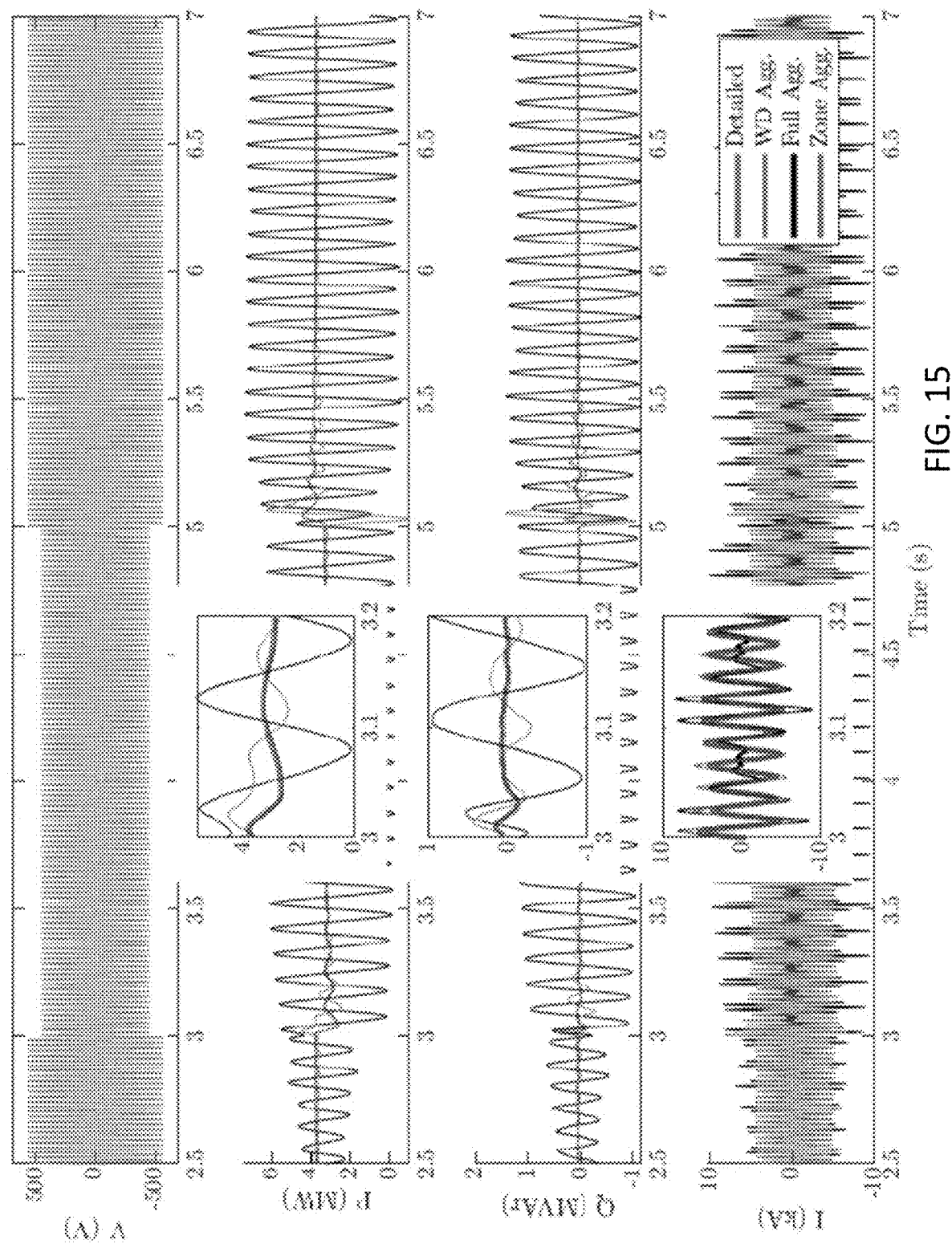
FIG. 15 depicts PCC voltage, phase A current and active and reactive power for FIG. 13 DFIG windfarm with similar WTG parameters and its Full Agg, Zone Agg and WD Agg models.
Figure 16:
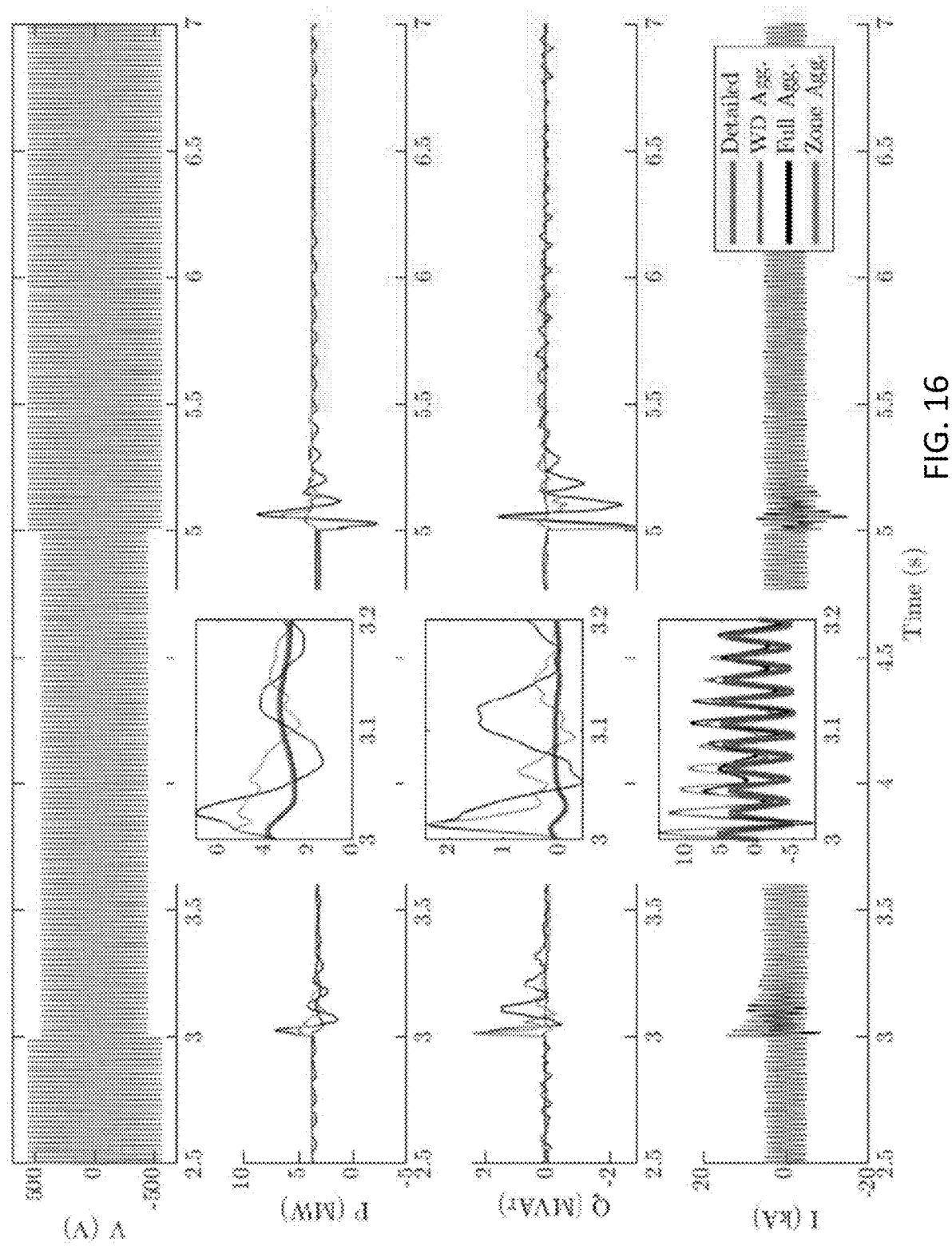
FIG. 16 depicts PCC voltage, phase A current and active and reactive power for FIG. 13 DFIG windfarm with similar WTG parameters, its Full Agg and Zone Agg models with modified controllers and its WD Agg model.
Figure 17:
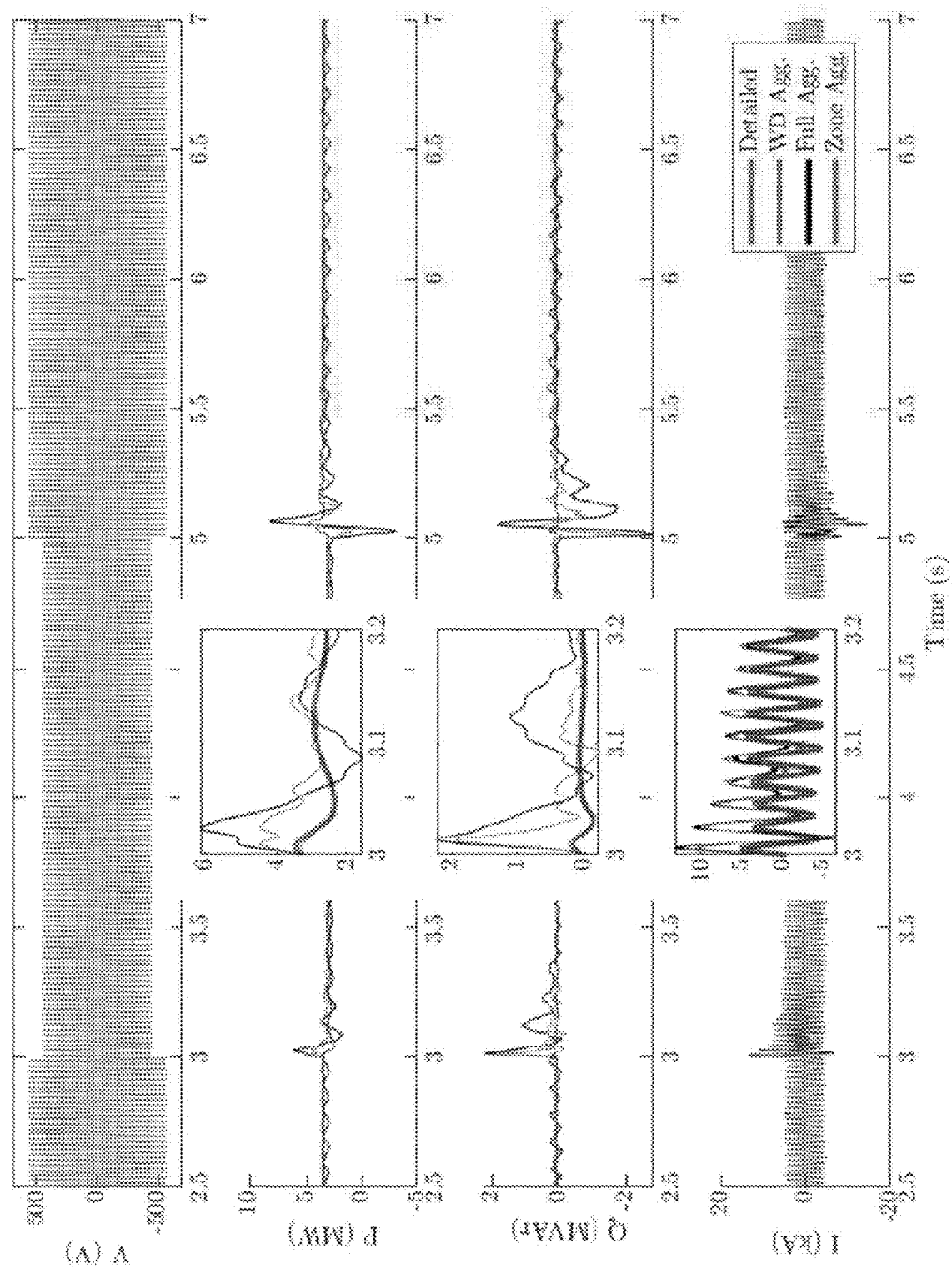
FIG. 17 depicts PCC voltage, phase A current and active and reactive power for FIG. 13 DFIG windfarm with unequal WTG parameters, its WD Agg model and its modified Full Agg and Zone Agg models.
Figure 18:
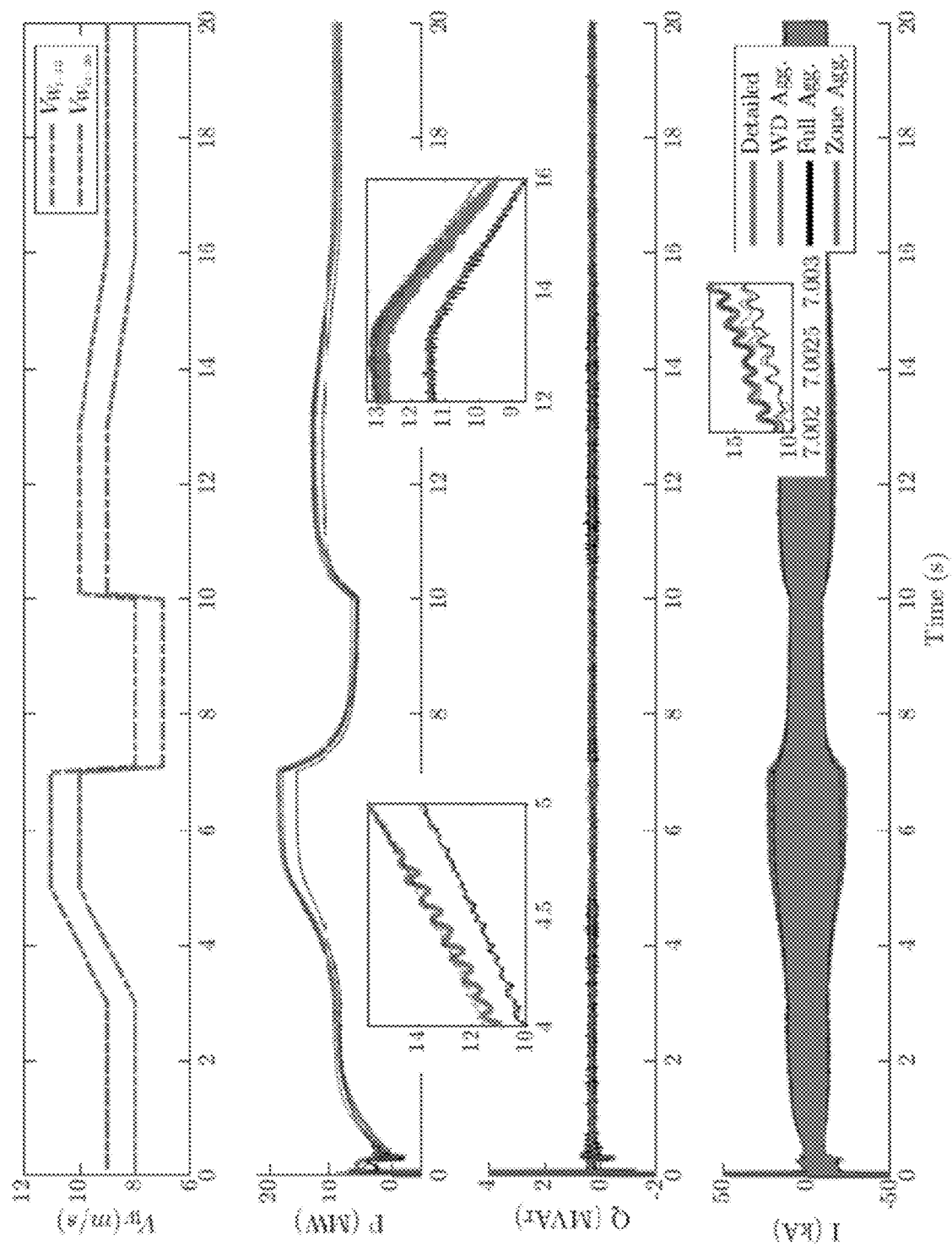
FIG. 18 depicts wind speed, phase A current and active and reactive power for FIG. 14 DFIG windfarm with unequal WTG parameters, its Full Agg and Zone Agg models with modified controllers and its WD Agg model.
Figure 19:
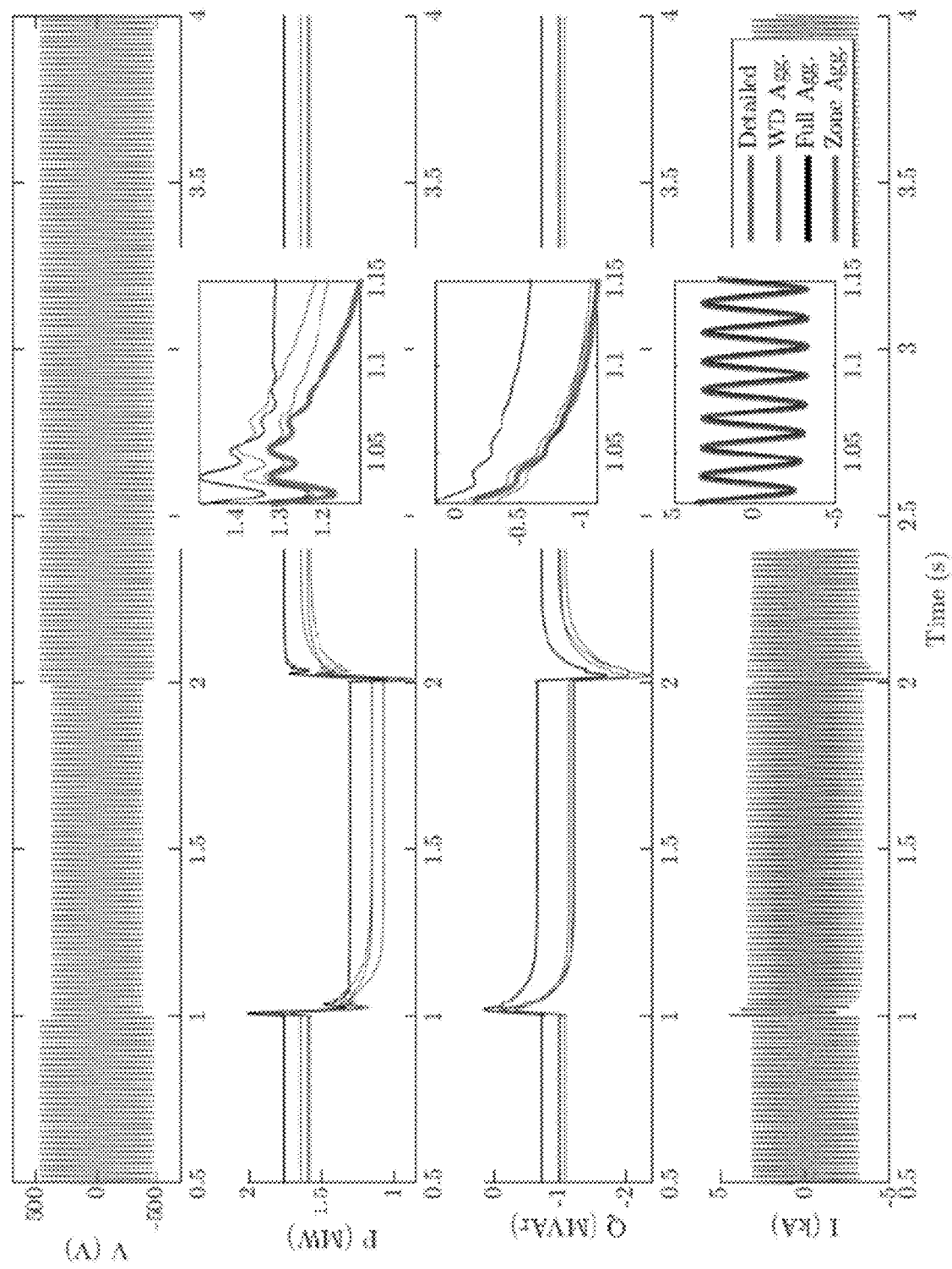
FIG. 19 depicts PCC voltage, phase A current and active and reactive power for FIG. 13 fixed-speed windfarm with unequal WTG parameters, its modified Full Agg, Zone Agg and WD Agg models.

Equation 18:

Based on Equation 18, the frequency domain model of wind farm is formulated similar to a single unit WTG as given in Equation 15. The schematic diagram of the equivalent circuit for this model is shown in FIG. 8. As the wind farm model is developed based on linearized model of WTGs, the parameters of equivalent model of wind farm in FIG. 8 can be readily determined using the impact factors $u_k$, k=1, 2, . . . , n, e.g.

$$X_{rr}^{[pu]} = \sum_{k=1}^{n} X_{rr_k}^{[pu]} u_k, X_{ss}^{[pu]} = \sum_{k=1}^{n} X_{ss_k}^{[pu]} u_k,$$

etc. The main difference between the inventive I.F. Agg. and Full Agg. methods and in fact the key contribution of the I.F. Agg. is to calculate the parameters of equivalent model based on weighted averaging using impact factors $u_k$ to provide more accurate results compared with existing methods.

An equivalent collector system and shunt capacitors can be defined with equivalent $R_C$ and $C_C$ as shown in FIG. 3B. $R_C$ can be determined from the steady state power balance or it can be obtained based on weighted averaging method as $R_C^{[pu]} = \sum_{k=1}^{n} R_{C_k}^{[pu]} u_k$ Using FIG. 3B and considering the steady state equivalent circuit of induction generator, the per phase reactive demand from grid for k-th unit is shown in Equation 19.

$$Q_{d_k} = V_{s_k}^2 \left( \frac{1}{X_{m_k}} + \frac{X_{ls} + X_{lr}}{\left(\frac{R_r}{s}\right)^2 + (X_{ls} + X_{lr})^2} - \omega_s C_{C_k} \right).$$

Equation 19 where $V_{sk}$ is the effective voltage at the terminal of the k-th WTG unit. The equivalent capacitor $C_C$ is obtained based on reactive power balance, as given by Equation 20.

$$Q_d = V_s^2 \left( \frac{1}{X_m} + \frac{X_{ls} + X_{lr}}{\left(\frac{R_r}{s}\right)^2 + (X_{ls} + X_{lr})^2} - \omega_s C_C \right) ==$$

Equation 20

$$\sum_{k=1}^{n} V_{s_k}^2 \left( \frac{1}{X_{m_k}} + \frac{X_{ls_k} + X_{lr_k}}{\left(\frac{R_{r_k}}{s_k}\right)^2 + (X_{ls_k} + X_{lr_k})^2} - \omega_s C_{C_k} \right).$$

Considering a low loss collector system, $V_{sk} \cong V_s$ for k=1, 2, . . . , n. Thus, Equation 20 yields Equation 21.

$$C_C = \frac{1}{\omega_s X_m} + \frac{(X_{ls} + X_{lr})/\omega_s}{\left(\frac{R_r}{s}\right)^2 + (X_{ls} + X_{lr})^2} --$$

Equation 21

$$\sum_{k=1}^{n} \left( \frac{1}{\omega_s X_{m_k}} + \frac{(X_{ls_k} + X_{lr_k})/\omega_s}{\left(\frac{R_{r_k}}{s_k}\right)^2 + (X_{ls_k} + X_{lr_k})^2} - C_{C_k} \right).$$

To determine the parameters of equivalent wind turbine for a wind farm, assuming, $$P_w = \sum_{k=1}^{n} P_{w_k}$$

Equation 22 is obtained.

$$P_W = \frac{1}{2}\rho A V_W^3 = \sum_{k=1}^{n} P_{w_k} = \sum_{k=1}^{n} \frac{1}{2}\rho A_k V_{W_k}^3,$$

Equation 22 where $$A = \sum_{k=1}^{n} A_k$$

is the equivalent surface of all WTGs. Thus, the equivalent radius, r, and wind speed, Vw, can be expressed as Equation 23.

$$r = \left( \sum_{k=1}^{n} r_k^2 \right)^{\frac{1}{2}}, \quad V_W = \left( \sum_{k=1}^{n} A_k V_{W_k}^3 \bigg/ \sum_{k=1}^{n} A_k \right)^{\frac{1}{3}}.$$

Equation 23

The equivalent mechanical power, $$P_m = \sum_{k=1}^{n} P_{m_k}, \text{and}$$

incremental power $$\Delta P_m = \sum_{k=1}^{n} \Delta P_{m_k},$$

, equations yield Equation 24 and Equation 25.

$$C_p(\lambda')P_W = \sum_{k=1}^{n} C_{p_k}(\lambda'_k)P_{w_k}$$

Equation 24

$$P_W \frac{\partial C_p}{\partial \lambda'} \frac{r}{V_W} \Delta \omega_r = \sum_{k=1}^{n} P_{w_k} \frac{\partial C_{p_k}}{\partial \lambda'_k} \frac{r_k}{V_{W_k}} \Delta \omega_{r_k}.$$

Equation 25

Therefore, equivalent $C_{pm}$ and $\lambda'_{opt}$ in Equation 3 can be obtained from the simultaneous solutions of Equation 24 and Equation 25. Finally, $\lambda_{opt}$ and gear-box ratio, G, for the equivalent wind turbine generator can be defined based on weighted average of $\lambda_{optk}$ with respect to radii $r_k$ for k=1, 2, . . . , n as Equation 26.

$$\frac{\lambda_{opt}}{r} \triangleq \frac{1}{n}\sum_{k=1}^{n}\frac{\lambda_{opt_k}}{r_k}, G \triangleq \frac{\lambda'_{opt}}{\lambda_{opt}}. \qquad \text{Equation 26}$$

Figure 5:
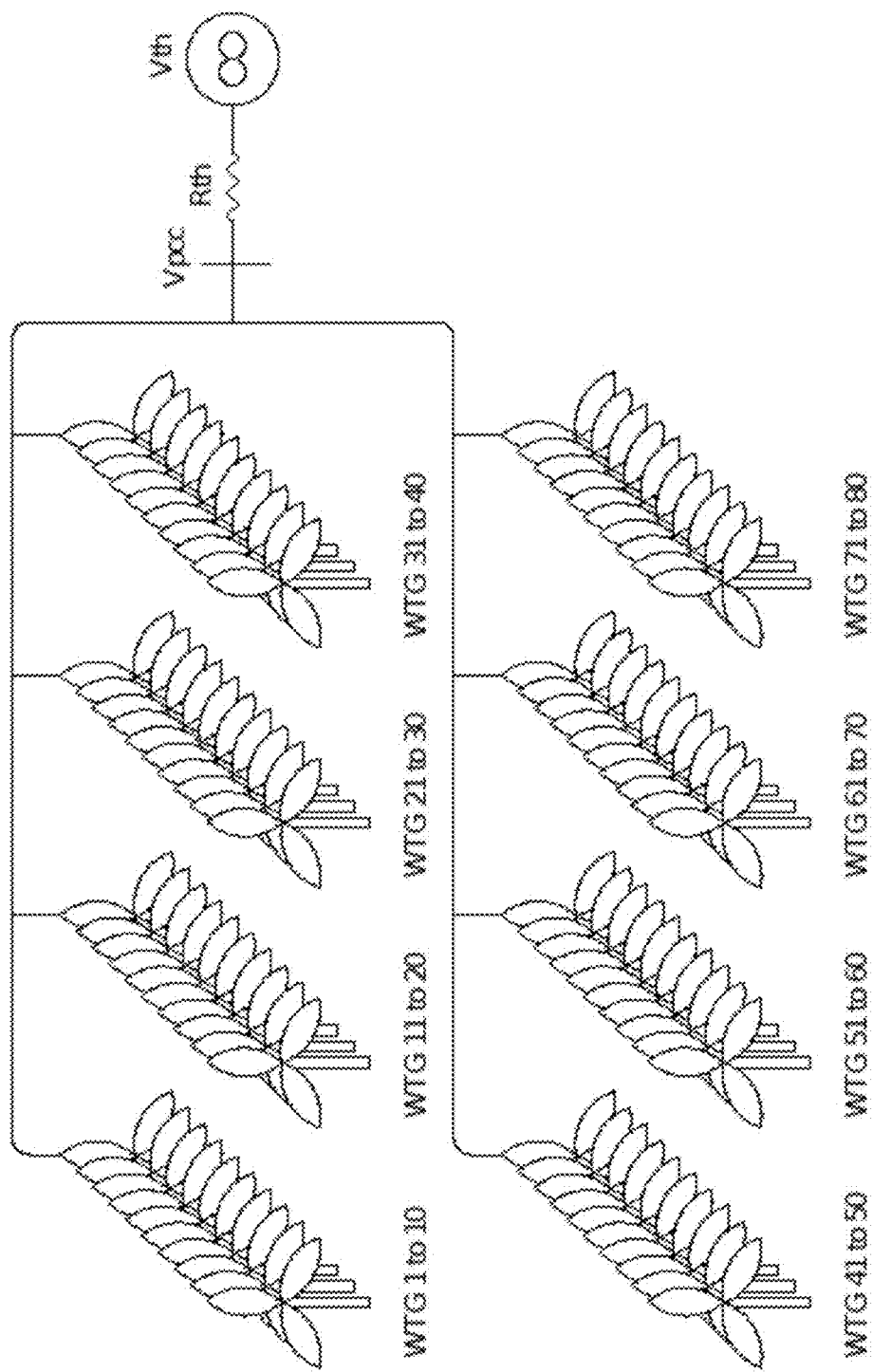
FIG. 5 is a schematic of a wind farm with 80 wind turbine generator units.
Figures 6A, 6B:
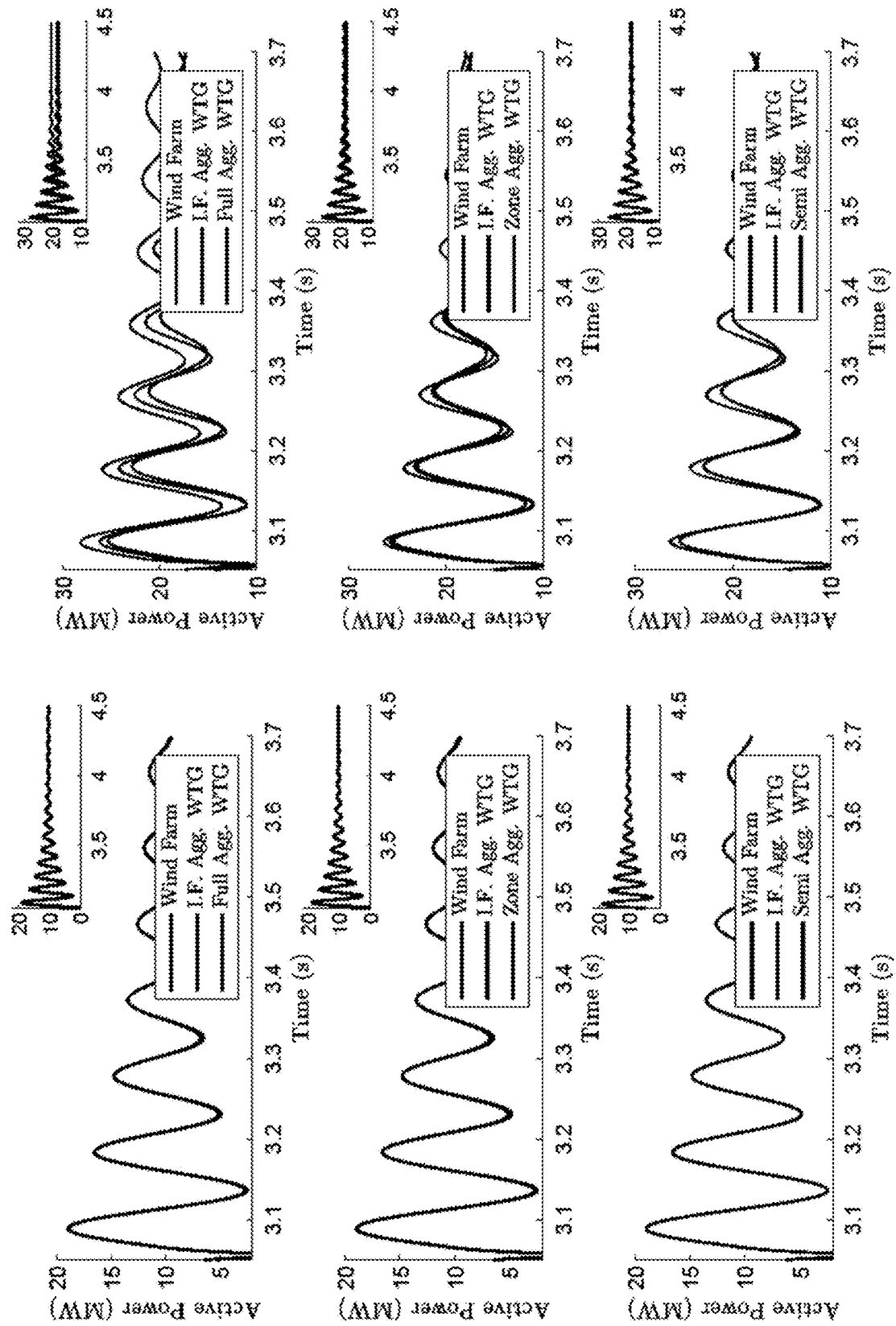
FIGS. 6A-6D are graphs showing active power dynamic behavior of system using Full aggregation, Zone aggregation, Semi aggregation and I.F aggregation models in four different scenarios covering the combinations of various wind speed inputs and different WTGs parameters in a wind farm system according to embodiments of the present invention.
Figures 6C, 6D:
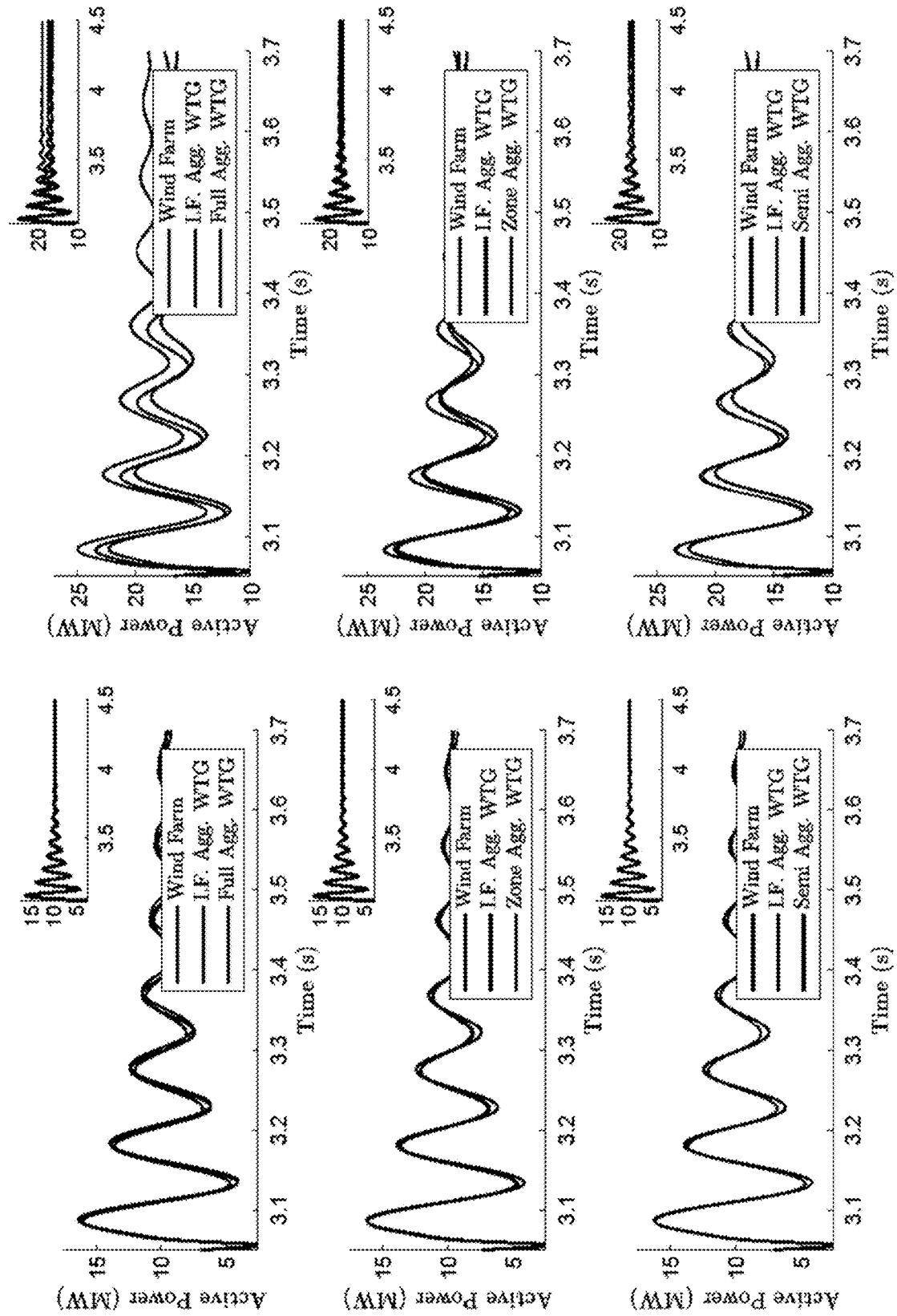

Next, the performance and accuracy of the inventive I.F. Agg. method in comparison with Full, Zone, and Semi Agg. methods are compared using a fixed speed wind farm study system. According to embodiments, the system includes 80 WTG units as shown in FIG. 5 that are interconnected using a collector system with a given schematic in FIG. 3B. The wind farm is fully simulated using detailed parameters given in Table 1 and the simulation test results are used to generate the reference curves and points for calculation of the accuracy.

Furthermore, the simulation time of the 80-WTG wind farm is considered as the reference to compare the computational efficiency of different methods. Two types of generators with different parameters and ratings (Types I and II) are used in four different test scenarios A, B, C, and D, in which WTGs can have various wind speeds. The parameters of wind turbine generators Type I and II are listed in Table 1 and the details of test scenarios are as follows:

A. All WTG units are Type I with the same wind speeds, $V_{Wk}$=20 m/s for 1≤k≤80;
B. All WTG units are Type I with different wind speeds at $$V_{W_k} = \begin{cases} 20 & 1 \le k \le 20 \\ 16 & 21 \le k \le 40 \\ 12 & 41 \le k \le 60 \\ 8 & 61 \le k \le 80 \end{cases};$$

C. The first half of WTGs are Type I, the second half are Type II, and they all operate at same wind speeds, $V_{Wk}$=20 m/s for 1≤k≤80;
D. The first half of WTGs are Type I, the second half are Type II, and the wind speed of WTGs are:

$$V_{W_k} = \begin{cases} 20 & 1 \le k \le 10 \text{ or } 41 \le k \le 50 \\ 16 & 11 \le k \le 20 \text{ or } 51 \le k \le 60 \\ 12 & 21 \le k \le 30 \text{ or } 61 \le k \le 12 \\ 8 & 31 \le k \le 40 \text{ or } 71 \le k \le 80 \end{cases}.$$

TABLE I

PARAMETERS OF TYPE I AND II WTG UNITS

| Name of the parameter | Type I | Type II | Units |
|---|---|---|---|
| GENERATOR | | | |
| $S_b$ | 150 | 110 | [kVA] |
| $V_s$ | 460 | 460 | [V] |
| $f_s$ | 60 | 60 | [Hz] |
| H | 0.3096 | 0.3175 | [s] |
| D | 0.0114 | 0.006839 | [pu] |
| $R_s$ | 0.01282 | 0.01597 | [pu] |
| $R_r$ | 0.00702 | 0.009103 | [pu] |
| $X_m$ | 2.503 | 2.183 | [pu] |

TABLE I-continued

PARAMETERS OF TYPE I AND II WTG UNITS

| Name of the parameter | Type I | Type II | Units |
|---|---|---|---|
| $X_{ss}$ | 2.55351 | 2.23942 | [pu] |
| $X_{rr}$ | 2.55351 | 2.23942 | [pu] |
| P (poles) | 4 | 4 | — |
| COLLECTOR & GRID | | | |
| $R_c$ | 0.05 | 0.05 | [pu] |
| $C_c$ | 2.63 | 2.63 | [mF] |
| $V_{th}$ | 460 | 460 | [V] |
| $R_{th}$ | 0.01 | 0.01 | [pu] |
| TURBINE | | | |
| $V_{W_b}$ | 12 | 11.33 | [m/s] |
| r | 10.6 | 10 | [m] |
| G | 23.55 | 23.55 | — |
| $C_{pm}$ | 0.4 | 0.4 | — |
| $\lambda_{opt}$ | 8 | 8 | — |

These four scenarios cover all events that can occur for a wind farm including different machine types and various wind speeds. The tests start at $t_0$=3 s by applying a small signal disturbance, that is a limited 3-phase connection to ground via resistances $R_f$=0.09 pu at PCC for 3 cycles. After removing this small signal disturbance, the wind farm operating point will be back to its prior operating point at t=3.

To investigate the performance and accuracy of the aggregation methods the Total Normalized Simulation Time and Error (TNSTE) criterion is defined and used to evaluate the proposed and existing methods. TNSTE consists of three main components as:

1) Normalized simulation time, STE, that is defined as the ratio of detailed wind farm study system simulation time to the one for an aggregation method;
2) Steady state error of the aggregated methods at their operating points, given by Equation 27.

$$e_{ss} = \left|\frac{\hat{f}_{ss} - f_{ss}}{f_{ss}}\right|. \qquad \text{Equation 27}$$

fss in (27) denotes the steady state of f∈{V, I, P,Q} where V, I, P, and Q are the voltage, current, real, and reactive power at the point of common coupling of wind farm and grid. ^f represents the corresponding quantity to $f_{ss}$ that is obtained from an aggregated model for the study state wind farm;

3) Transient error of the aggregated methods at a specific operating point following to a small signal disturbance that is defined as Equation 28.

$$e_{Trans} = \left|\frac{\frac{1}{T}\int_{t_0}^{T+t_0}(\hat{f}(t) - f(t))dt}{f_{ss}(t_0^-)}\right|, \qquad \text{Equation 28}$$

where t0 is the fault time and $f_{ss}(t_0^-)$ is the steady state quantity prior to the small signal disturbance.

TNSTE is defined as the summation of these three normalized components as Equation 29.

$$\text{TNSTE}=\text{STE}+e_{ss}+e_{Trans}. \qquad \text{Equation 29:}$$

The study system is simulated in MATLAB/SIMULINK software tool and the test results for active power following the small disturbance are depicted in FIGS. 6A-6d corresponding to the four test scenarios A, B, C, and D. For each scenario, the accuracy of the inventive I.F. Agg. method and one of the Full, Zone, and Semi Agg. methods are compared with the detailed 80-unit wind farm test results. The conclusions of active power simulations are:

1) if the WTG parameters and wind speed of the units in a wind farm are similar (an unrealistic assumption), all equivalent aggregated systems accurately describe the wind farm behavior (FIG. 6A);
2) The accuracy of Full Agg. method is highly sensitive to wind speed variations between the zones (FIGS. 6B and 6D);
3) The Full Agg. method is also slightly sensitive to non-unison WTG units with different parameter. The Zone and Semi Agg. methods are more accurate compared with Full Agg. method in all test scenarios;
4) The I.F. Agg. method provides more accurate results compared with Full and Semi Agg. methods in all test scenarios. However, Zone Agg. method in terms of active power matching is slightly more accurate in test scenarios (b) and (d).

The last conclusion is expected since in scenarios (b) and (d) the wind speed is different in four zones, thus, the Zone Agg. method that uses four equivalent WTGs corresponding to each zone provides better matching with reference in terms of active power. However, it will be shown in the next analysis (FIG. 6) that the advantages of I.F. Agg. method outweigh the Zone Agg. method when the computational efficiency and accuracy of matching other quantities (e.g. reactive power) are taken into account.

To further evaluating the performance and accuracy of the methods, simulation results are also studied for reactive power, current, and voltage of the wind farm and the results are compared based on TNSTE index as elaborated in Equations 27 to 29.

Figure 7A:
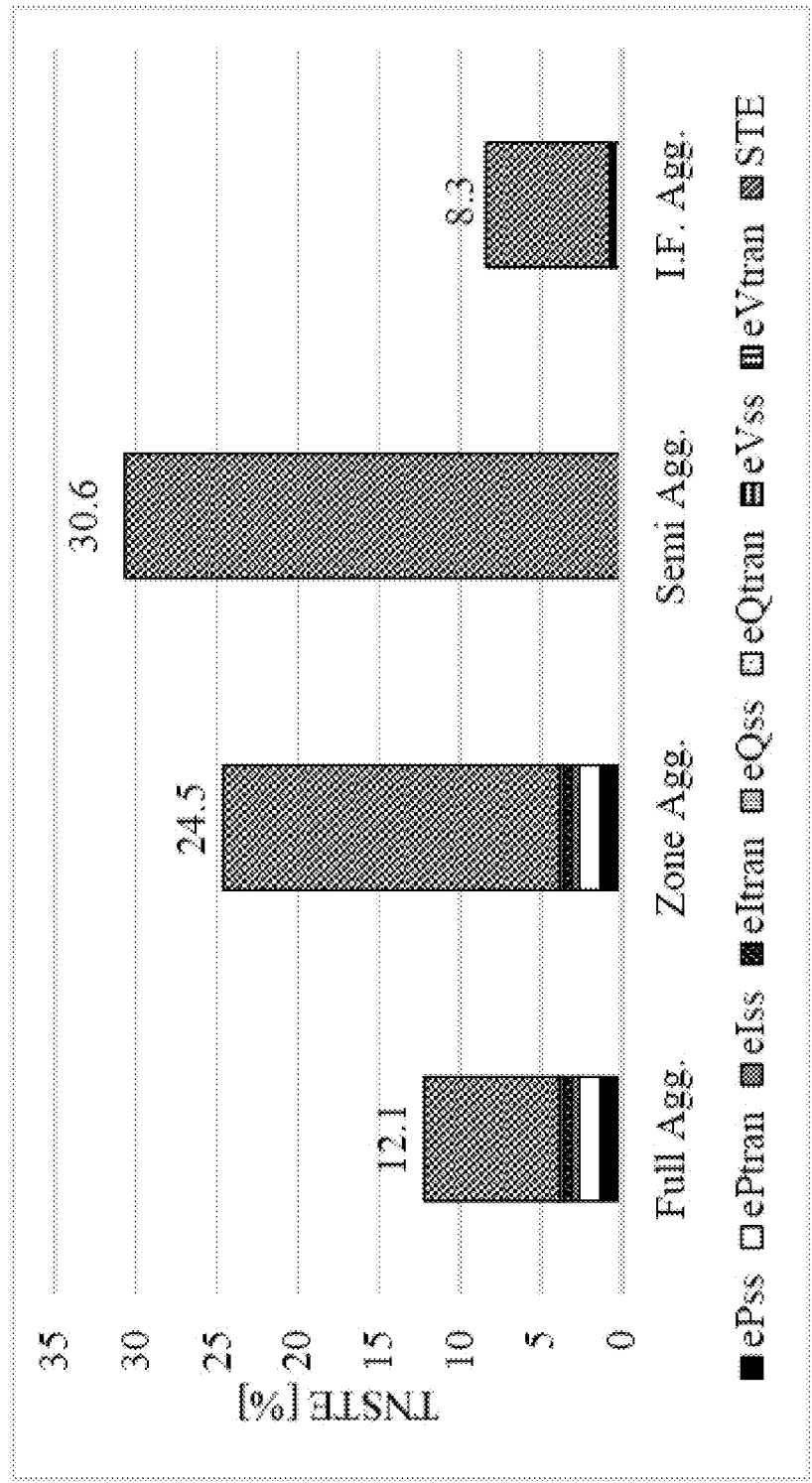
FIGS. 7A-7D are graphs showing Full aggregation, Zone aggregation, Semi aggregation, and I.F. aggregation methods overall error and simulation time in four different scenarios covering the combinations of various wind speed inputs and different WTGs parameters in a wind farm system according to embodiments of the present invention.
Figure 7B:
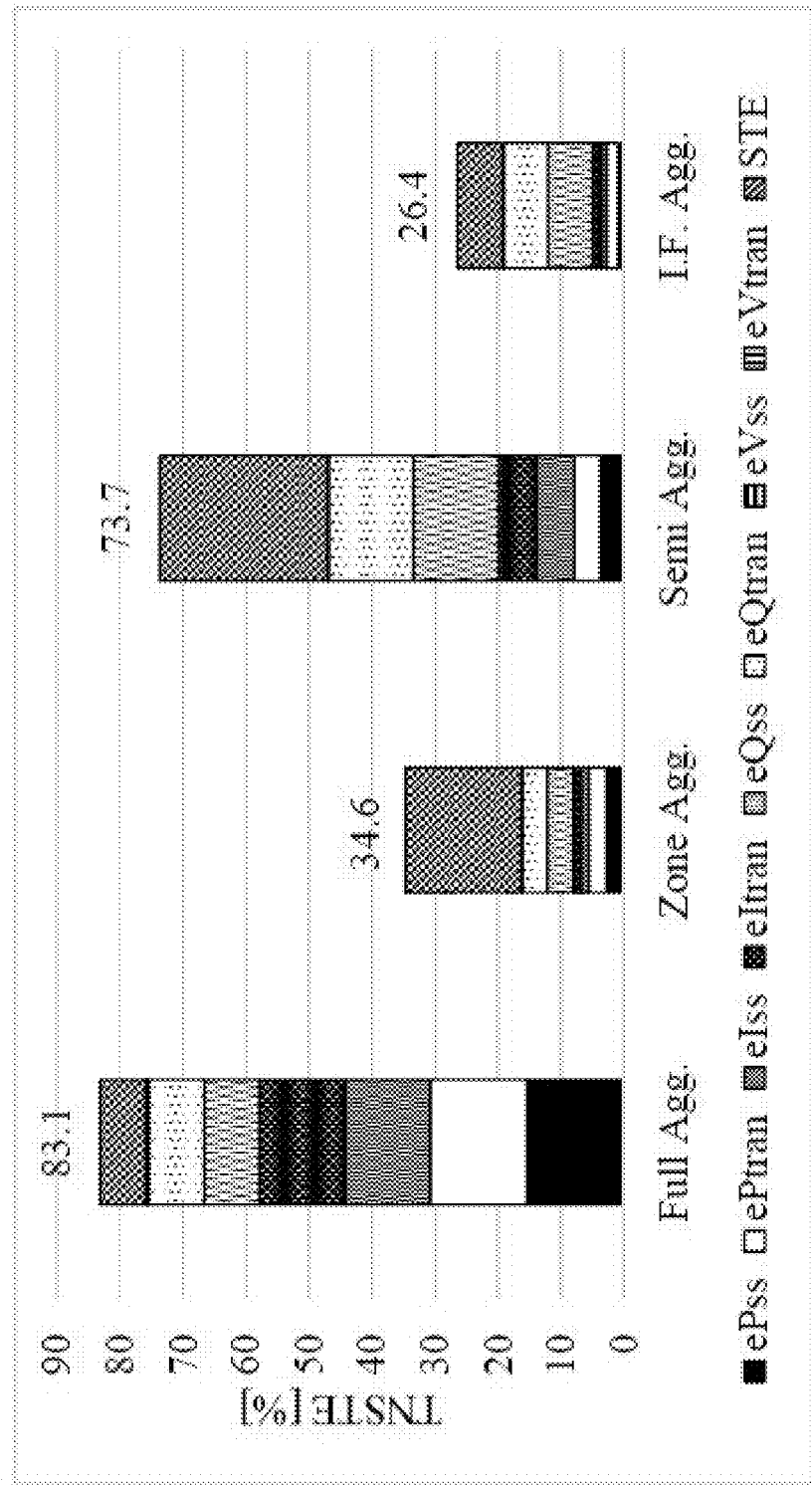
Figure 7C:
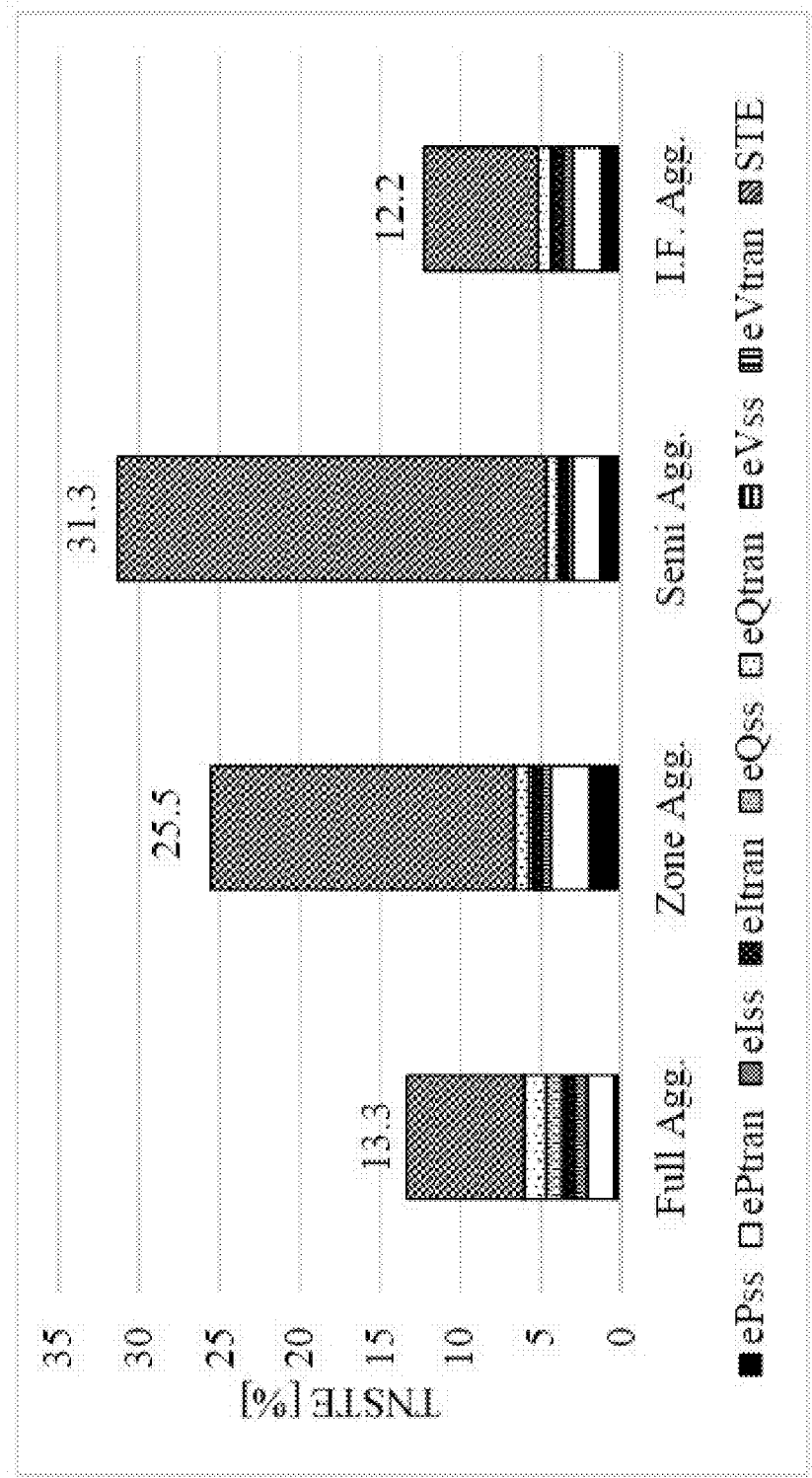
Figure 7D:
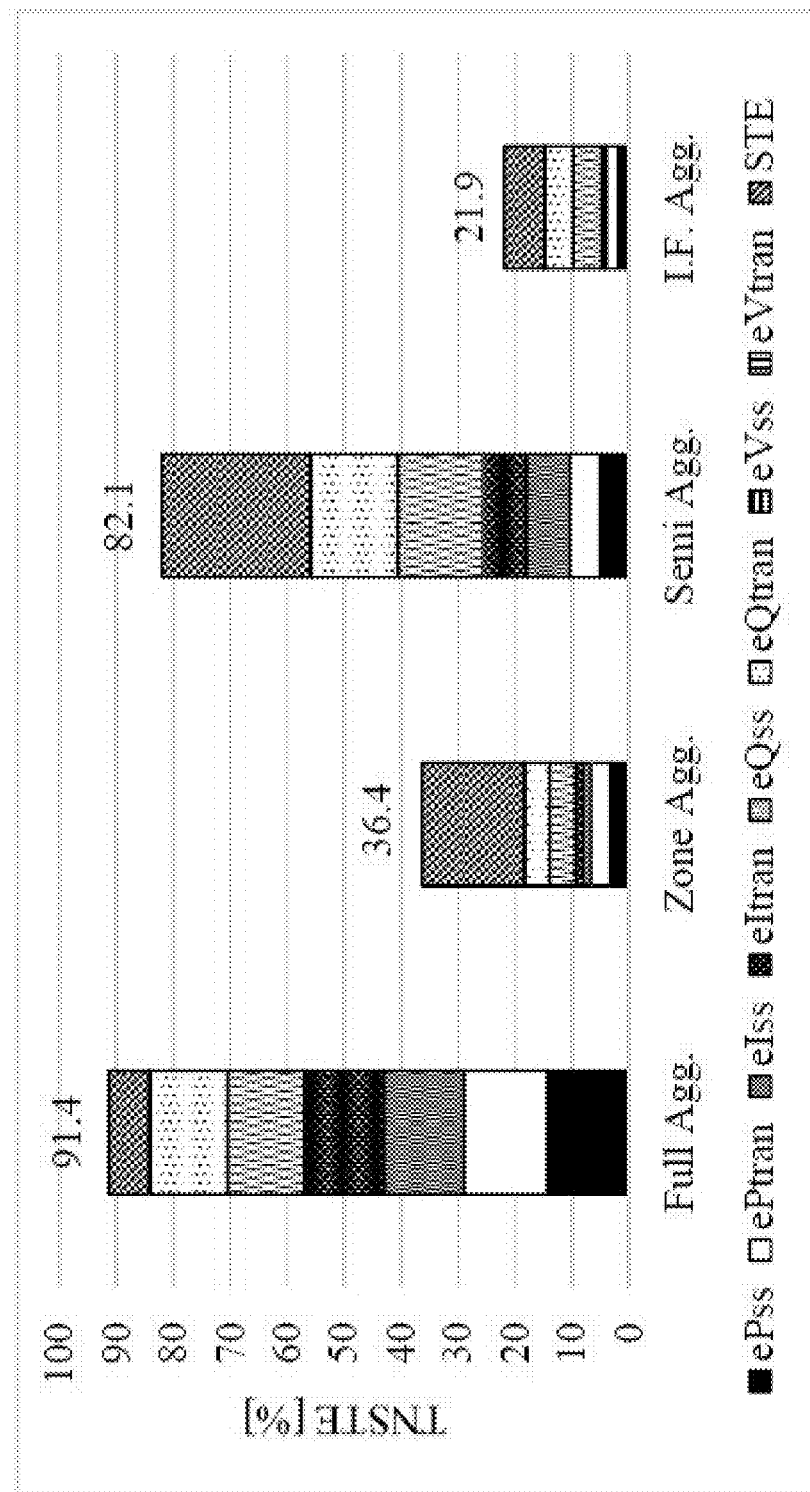

FIGS. 7A-7D show details of TNSTE components using color coded bars for each test scenario. The conclusion of test results are as follows:

1) in all test scenarios the normalized simulation times (STE) for Full Agg. and I.F. methods (shown with dark gray color) are significantly smaller than Zone and Semi Agg. methods. Thus, I.F. and Full Agg. methods are the most computationally efficient ways for developing equivalent systems for wind farms;
2) in case of uniform wind speed distribution (that is an unrealistic assumption) the normalized simulation time, TSE, is the dominant component in TNSTE index compared with the transient and steady state errors. Under this condition, I.F. and Full Agg. methods provide the best performance (FIGS. 7A and 7C);
3) in case of nonuniform wind speed distribution the steady state and transient errors comprise the most part of TNSTE. Except for the Zone Agg. method, the steady state and transient errors are dominant components of TNSTE compared with normalized simulation time. Thus, when the wind speeds at the zones are different quantities, I.F. and Zone. Agg. method provide the best performances for aggregation of the wind farm (FIGS. 7B and 7D);
4) The nonuniform wind speed distribution significantly increases the reactive power errors, as shown by light green and blue bars in FIGS. 7B and 7D. Thus, using only real power indicator is insufficient to evaluate the accuracy of aggregation methods;
5) Comparing the scenarios A and C for steady state and transient errors show that change of generator parameters slightly increase the errors, however, these are more sensitive to wind speed variations as shown in FIGS. 7B and 7D.

The overall test results in FIGS. 7A-7D show that when the wind speed is changing between the zones (e.g. in large-scale wind farms) the I.F. and Zone Agg. methods are the top two effective aggregation methods. However, if the wind speed is almost the same for all WTG units (e.g. in small-scale wind farms (then I.S. and Full Agg. methods can be considered as the superior aggregation methods. Furthermore, clustering algorithms for large-scale wind farms need revising in selection their indicators, i.e. reactive power and computational efficiency must be taken into account.

Based on a newly defined impact factor of WTG units within a wind farm, this paper presents a systematic analytical method to develop an aggregated system for large-scale fixed-speed wind farms. The aggregated model is established based on linearized dq dynamic model of WTG in frequency domain. It also encompasses an equivalent circuit for the collector system of the wind farm that significantly improves the accuracy of the model specially in terms of reactive power balance. Conventional aggregation methods become highly inaccurate when the wind speed at different zones of a large-scale wind farm are unequal. The advantage of the proposed impact factor method is to improve the accuracy of the aggregated model by considering the contribution of each WTG in the equivalent system based on its operating point current. A study system including 80 WTG units is used for performance evaluation and verification of the method. The test results of the different test scenarios show the superior performance and accuracy of the proposed impact factor aggregation method specially for large-scale wind farms with different wind speed zones.

Furthermore, $X_q$ and $X_d$ in Equations 9-12 are:

$$X_q = (X_m i_{qs0} + X_{rr} i_{qr0})\left(\frac{X_m}{\Delta_{m0}}\right),\qquad\text{Equation 30}$$

$$X_d = (X_m i_{ds0} + X_{rr} i_{dr0})\left(\frac{X_m}{\Delta_{m0}}\right),\qquad\text{Equation 31}$$

where $$\Delta_{m0} = 2Hj\omega + \left.\frac{\partial C_p}{\partial \lambda'}\right|_{\lambda'_0} \frac{rP_{W0}}{V_{W0}(1-s_0)} - \frac{P_{m0}}{(1-s_0)^2}.$$

$\alpha_{q,d}$ and $\beta_{q,d}$ in Equations 13 and 14 are:

$$\alpha_{q,d} = A_{qs,ds} + \gamma_q C_{qs,ds} + \gamma_d D_{qs,ds},\qquad\text{Equation 32}$$

$$\beta_{q,d} = A_{qs,ds} + \gamma_q C_{qs,ds} + \gamma_d D_{qs,ds},\qquad\text{Equation 33}$$

where $$\gamma_q = \left(\frac{A_{qr} - \frac{D_{qr}}{D_{dr}}A_{dr}}{C_{qr} - \frac{D_{qr}}{D_{dr}}C_{dr}}\right),\ \gamma_d = \left(\frac{A_{dr} - \frac{C_{dr}}{C_{qr}}A_{qr}}{D_{dr} - \frac{C_{dr}}{C_{qr}}D_{qr}}\right),$$

$$\lambda_q = \left(\frac{B_{qr} - \frac{D_{qr}}{D_{dr}}B_{dr}}{C_{qr} - \frac{D_{qr}}{D_{dr}}C_{dr}}\right),\ \lambda_d = \left(\frac{B_{dr} - \frac{C_{dr}}{C_{qr}}B_{qr}}{D_{dr} - \frac{C_{dr}}{C_{qr}}D_{qr}}\right)$$

The incremental speed is $\Delta w_r = C(jw)\Delta i_{qs}$, and $C(jw)$ is:

$$C(j\omega) = \frac{X_m(i_{dr0} - i_{qr0}C_1 + i_{qs0}C_3 - i_{ds0}C_2)}{e_m + 2Hj\omega},$$

where $C_1 = -\alpha_d/\beta_d$, $C_2 = \gamma_q + \lambda_q C_1$, and $C_3 = \gamma_d + \lambda_d C_1$.

Virtual Synchronous Machine (VSM) is an inverter connected to the grid which is controlled by a new control method. This new control method helps the inverter acts similar to a synchronous generator in aspect of delivering active and reactive power to the grid. Therefore, VSM contributes to the frequency stability of the grid by an virtual inertia provided in the control loop. Conventional VSM control approach use a fixed value for virtual inertia. But more advanced control techniques change the virtual inertia value accordingly to achieve desired behavior. But changing just one parameter of synchronous machine will result in moving the operation point from the nominal point. Moreover, it may move the system eigenvalues away from the realistic values. To prevent the following issues extra control loops and protection should be added to the system.

Impact Factor Aggregation method obtains the equivalent d-q model of the wind farm by considering the contribution of each wind turbine generator (WTG) in the model, and use these equation to control an inverter to act like a wind farm. By changing of the operation point, the virtual wind farm will be modeled by connecting or disconnecting of some WTGs while the remaining connected WTGs working near to their operation point. This method resolve the issues mentioned above automatically and let the system work without extra protection.

To calculate virtual wind farm parameters, every parameter obtained by electrical impact factors in per unit. For example, the calculated $X_{rr}$ can be obtained by $X_{rr}^{[pu]} = \sum_{m=1}^{n} u_{rm} X_{rm}^{[pu]}$, and the base apparent power is obtained as $S_b = \sum_{j=1}^{n} S_{bj}$.

The electrical torque of induction machine can be found by Equation 35. Equation 35:

$$T_e = \frac{X_m^2 R_r s_0 |v_s|}{\Delta_{T_e}}$$

where $$\Delta_{T_e} = \left[R_s R_r + s_0(X_m^2 - X_{ss}X_{rr})\right]^2 + [R_r X_{ss} + s_0 R_s X_{rr}]^2.$$

Steady-state stator d-q currents are shown by Equations 36 and 37.

$$i_{qr0} = -\frac{s_0^2 X_m X_{rr}}{s_0^2 X_{rr}^2 + R_r^2}i_{qs0} - \frac{s_0 X_m R_r}{s_0^2 X_{rr}^2 + R_r^2}i_{ds0},$$ Equation 36

$$i_{dr0} = \frac{s_0 X_m R_r}{s_0^2 X_{rr}^2 + R_r^2}i_{qs0} - \frac{s_0^2 X_m X_{rr}}{s_0^2 X_{rr}^2 + R_r^2}i_{ds0}$$

$$i_{qs0} = \frac{v_{qs0} - \frac{B_{q0}}{B_{d0}}v_{ds0}}{A_{q0} - A_{d0}}, \quad i_{ds0} = \frac{v_{ds0} - \frac{A_{d0}}{A_{q0}}v_{qs0}}{B_{d0} - B_{q0}}$$ Equation 37 where $A_q 0$, $B_q 0$, $A_d 0$ and $B_d 0$ are shown by Equation 38. Equation 38:

$$A_{q0} = R_s + \frac{s_0 X_m^2 R_r}{R_r^2 + s_0^2 X_{rr}^2}, \quad B_{q0} = X_{ss} + \frac{s_0^2 X_m^2 X_{rr}}{R_r^2 + s_0^2 X_{rr}^2}$$ Equation 38

$$A_{d0} = -X_{ss} + \frac{s_0^2 X_m^2 X_{rr}}{R_r^2 + s_0^2 X_{rr}^2}, \quad B_{d0} = R_s + \frac{s_0 X_m^2 R_r}{R_r^2 + s_0^2 X_{rr}^2}$$

Second-order equation of $s_0$ is $$\alpha_2 s_0^2 - \alpha_1 s_0 + \alpha_0 = 0,$$

where $\alpha_2$, $\alpha_1$ and $\alpha_0$ are shown by Equation 39.

$\alpha_2 = DR_r + v_s^2, \alpha_1 = 2DR_r + v_s^2, \alpha_0 = DR_r - P_m R_r$ equation 39:

Mechanical linearized equation of induction machine is shown by Equation 40.

$\Delta T_m = X_m i_{dr0}\Delta i_{qs} - X_m i_{qr0}\Delta i_{ds} - X_m i_{ds0}\Delta i_{qr} + X_m i_{qs0}\Delta i_{dr} - 2Hp\Delta\omega_r$ Equation 40:

The resulted four electrical linearized equations by reducing $\Delta w_r$ from d-q equations of Equations 41-44.

$\Delta v_{qs} = A_{qs}(j\omega)\Delta i_{qs} + B_{qs}(j\omega)\Delta i_{ds} + C_{qs}(j\omega)\Delta i_{qr} + D_{qs}(j\omega)\Delta i_{dr}$ Equation 41:

$\Delta v_{ds} = A_{ds}(j\omega)\Delta i_{qs} + B_{ds}(j\omega)\Delta i_{ds} + C_{ds}(j\omega)\Delta i_{qr} + D_{ds}(j\omega)\Delta i_{dr}$ Equation 42:

$\Delta v_{qr} = A_{qr}(j\omega)\Delta i_{qs} + B_{qr}(j\omega)\Delta i_{ds} + C_{qr}(j\omega)\Delta i_{qr} + D_{qr}(j\omega)\Delta i_{dr} = 0$ Equation 43:

$\Delta v_{dr} = A_{dr}(j\omega)\Delta i_{qs} + B_{dr}(j\omega)\Delta i_{ds} + C_{dr}(j\omega)\Delta i_{qr} + D_{dr}(j\omega)\Delta i_{dr} = 0$ Equation 44:

Where $A_{qs}(jw)$, $B_{qs}(jw)$, $C_{qs}(jw)$, . . . are shown by Equation 45.

$$A_{qs} = R_s + \frac{j\omega}{\omega_b}X_{ss}, \quad B_{qs} = X_{ss}, \quad C_{qs} = \frac{j\omega}{\omega_b}X_m, \quad D_{qs} = X_m$$ Equation 45

$$A_{ds} = -X_{ss}, \quad B_{ds} = R_s + \frac{j\omega}{\omega_b}X_{ss}, \quad C_{ds} = -X_m, \quad D_{ds} = \frac{j\omega}{\omega_b}X_m$$

$$A_{qr} = \frac{j\omega}{\omega_b}X_m - (X_m i_{ds0} + X_{rr}i_{dr0})\left(\frac{X_m}{\Delta_{m0}}\right)i_{dr0}$$

$$B_{qr} = s_0 X_m + (X_m i_{ds0} + X_{rr}i_{dr0})\left(\frac{X_m}{\Delta_{m0}}\right)i_{qr0}$$

$$C_{qr} = R_r + \frac{j\omega}{\omega_b}X_{rr} + (X_m i_{ds0} + X_{rr}i_{dr0})\left(\frac{X_m}{\Delta_{m0}}\right)i_{ds0}$$

$$D_{qr} = s_0 X_{rr} - (X_m i_{ds0} + X_{rr}i_{dr0})\left(\frac{X_m}{\Delta_{m0}}\right)i_{qs0}$$

$$A_{dr} = -s_0 X_m + (X_m i_{qs0} + X_{rr}i_{qr0})\left(\frac{X_m}{\Delta_{m0}}\right)i_{dr0}$$

$$B_{dr} = \frac{j\omega}{\omega_b}X_m - (X_m i_{qs0} + X_{rr}i_{qr0})\left(\frac{X_m}{\Delta_{m0}}\right)i_{qr0}$$

$$C_{dr} = -s_0 X_{rr} - (X_m i_{qs0} + X_{rr}i_{qr0})\left(\frac{X_m}{\Delta_{m0}}\right)i_{ds0}$$

$$D_{dr} = R_r + \frac{j\omega}{\omega_b}X_{rr} + (X_m i_{qs0} + X_{rr}i_{dr0})\left(\frac{X_m}{\Delta_{m0}}\right)i_{qs0}$$

where $$\Delta_{m0} = 2Hj\omega + \frac{\partial C_p}{\partial \lambda}\frac{rP_W}{(G)V_W(1-s_0)} - \frac{P_{m0}}{(1-s_0)^2}$$

The resulted two d-q linearized equation by reducing rotor and mechanical linearized equations is shown by Equation 46.

$$\Delta v_{qs} = \alpha_q(j\omega)\Delta i_{qs} + \beta_q(j\omega)\Delta i_{ds}, \Delta v_{ds} = \alpha_d(j\omega)\Delta i_{qs} + \beta_d(j\omega)\Delta i_{ds} \qquad \text{Equation 46:}$$

where $\alpha_q(jw)$, $\beta_q(jw)$, $\alpha_d(jw)$ and $\beta_d(jw)$ are shown by Equation 47.

$$\alpha_q = A_{qs} + C_{qs}\left(\frac{A_{qr} - \frac{D_{qr}}{D_{dr}}A_{dr}}{C_{qr} - \frac{D_{qr}}{D_{dr}}C_{dr}}\right) + D_{qs}\left(\frac{A_{dr} - \frac{C_{dr}}{C_{qr}}A_{qr}}{D_{dr} - \frac{C_{dr}}{C_{qr}}D_{qr}}\right) \qquad \text{Equation 47}$$

$$\beta_q = B_{qs} + C_{qs}\left(\frac{B_{qr} - \frac{D_{qr}}{D_{dr}}B_{dr}}{C_{qr} - \frac{D_{qr}}{D_{dr}}C_{dr}}\right) + D_{qs}\left(\frac{B_{dr} - \frac{C_{dr}}{C_{qr}}B_{qr}}{D_{dr} - \frac{C_{dr}}{C_{qr}}D_{qr}}\right)$$

$$\alpha_d = A_{ds} + C_{ds}\left(\frac{A_{qr} - \frac{D_{qr}}{D_{dr}}A_{dr}}{C_{qr} - \frac{D_{qr}}{D_{dr}}C_{dr}}\right) + D_{ds}\left(\frac{A_{dr} - \frac{C_{dr}}{C_{qr}}A_{qr}}{D_{dr} - \frac{C_{dr}}{C_{qr}}D_{qr}}\right)$$

$$\beta_d = B_{ds} + C_{ds}\left(\frac{B_{qr} - \frac{D_{qr}}{D_{dr}}B_{dr}}{C_{qr} - \frac{D_{qr}}{D_{dr}}C_{dr}}\right) + D_{ds}\left(\frac{B_{dr} - \frac{C_{dr}}{C_{qr}}B_{qr}}{D_{dr} - \frac{C_{dr}}{C_{qr}}D_{qr}}\right)$$

Therefore the electrical impact factors can be found using Equation 48.

$$u_m = \frac{\Delta i_{qsm}}{\Delta i_{qs}} \qquad \text{Equation 48}$$

where:

$$\Delta v_{qs} = K(j\omega)\Delta i_{qs} + G(j\omega)\Delta v_{ds}, \qquad \text{Equation 49}$$

$$K(j\omega) = \alpha_q(j\omega) - \frac{\beta_q(j\omega)\alpha_d(j\omega)}{\beta_d(j\omega)}$$

$$G(j\omega) = \frac{\beta_q(j\omega)}{\beta_d(j\omega)}$$

Relation between $\Delta w_r$ and $\Delta i_{qs}$ is $\Delta w_r = C(jw) \Delta i_{qs}$, where $C(jw)$ is shown by Equation 50.

$$C(j\omega) = \qquad \text{Equation 50}$$

$$\frac{X_m i_{dr0} - X_m i_{qr0} C_1(j\omega)}{C_0 + 2Hj\omega} + \frac{-X_m i_{ds0} C_2(j\omega) + X_m i_{qs0} C_3(j\omega)}{C_0 + 2Hj\omega}$$

where, $$C_0 = \left(\frac{\partial C_p(\lambda,\beta)}{\partial \lambda}\frac{rP_W}{(G)V_W} - T_{m0}\right)\frac{1}{\omega_{r0}}, \quad C_1(j\omega) = -\frac{\alpha_d}{\beta_d} \qquad \text{Equation 51}$$

$$C_2(j\omega) = \left(\frac{A_{qr}(j\omega) - \frac{D_{qr}(j\omega)}{D_{dr}(j\omega)}A_{dr}(j\omega)}{\Delta_q}\right) + \left(\frac{B_{qr}(j\omega) - \frac{D_{qr}(j\omega)}{D_{dr}(j\omega)}\beta_{dr}(j\omega)}{\Delta_q}\right)C_1(j\omega)$$

$$C_3(j\omega) = \left(\frac{A_{dr}(j\omega) - \frac{C_{dr}(j\omega)}{C_{qr}(j\omega)}A_{qr}(j\omega)}{\Delta_d}\right) + \left(\frac{B_{dr}(j\omega) - \frac{C_{dr}(j\omega)}{C_{qr}(j\omega)}\beta_{qr}(j\omega)}{\Delta_d}\right)C_1(j\omega)$$

Therefore, the mechanical impact factors can be found as Equation 52.

$$y_k = \frac{\Delta \omega_{r_k}}{\Delta \omega_{r_{eq}}} = \frac{C_k(j\omega)K(j\omega)}{K_k(j\omega)C(j\omega)} \qquad \text{Equation 52}$$

Equivalent system mechanical relations are shown using Equations 53 and 54.

$$\sum_{i=1}^{n} C_{pi}P_{Wi} = C_{peg}P_{Weq}, \text{ where } P_{W_{eq}} = \frac{1}{2}\rho A_{eq}V_{Weq}^3 \qquad \text{Equation 53}$$

$$\sum_{i=1}^{n} P_{Wi}\frac{\partial C_{pi}}{\partial \lambda_i'}\frac{r_i y_i}{V_{Wi}} = P_{Weq}\frac{\partial C_{peq}}{\partial \lambda_{eq}'}\frac{r_{eq}}{V_{Weq}} \qquad \text{Equation 54}$$

where:

$$\lambda' = G\lambda, \; A_{eq} = \sum_{k=1}^{n} A_k, \; r_{eq} = \sqrt{A_{eq}/\pi} \qquad \text{Equation 55}$$

$$C_{p_{eq}} = C_{pm_{eq}}f(\lambda'), \; G_{eq} = \frac{\lambda'_{opt_{eq}}}{\lambda_{opt_{eq}}},$$

$$\lambda_{opt_{eq}} = \frac{r}{n}\sum_{k=1}^{n}\frac{\lambda_{opt_k}}{r_k}$$

$\lambda'_{opt_{ca}}$ and $C_{pm_{eq}}$ can be found by help of Equations 53 and 54. Equivalent collector parameters can be found by Equations 56 and 57.

$$R_{C_{eq}}^{[pu]} = \sum_{k=1}^{n}R_{C_k}^{[pu]}u_k \qquad \text{Equation 56}$$

$$C_{C_{eq}} = \frac{1}{\omega_s X_{m_{eq}}} + \frac{(X_{ls_{eq}} + X_{lr_{eq}})/\omega_s}{\left(\frac{R_{req}}{s_{eq}}\right)^2 + (X_{ls_{eq}} + X_{lr_{eq}})^2} - \qquad \text{Equation 57}$$

$$\sum_{k=1}^{n}\left(\frac{1}{\omega_s X_{m_k}} + \frac{(X_{ls_k} + X_{lr_k})/\omega_s}{\left(\frac{R_{r_k}}{s_k}\right)^2 + (X_{ls_k} + X_{lr_k})^2} - C_{C_k}\right)$$

Other required equations are:

$$V_s = V_b\sqrt{\frac{R_s^2 + \omega_e^2 L_{ss}^2}{R_s^2 + \omega_b^2 L_{ss}^2}} \qquad \text{Equation 58}$$

-continued $$\omega_e = \frac{\omega_m + \sqrt{\max(0, \omega_m^2 + X_{corr})}}{2}$$ Equation 59

$$X_{corr} = 3P(v_{qs}i_{qs} - 2R_s I_s^2)/K_{tv}$$ Equation 60

$$K_{tv} = \frac{3\left(\frac{P}{2}\right)L_M^2 R_r V_b^2}{R_r^2(R_s^2) + \omega_b^2 L_{ss}^2}$$ Equation 61

While at least one exemplary embodiment has been presented in the foregoing description and attached appendix, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing description and incorporated references will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

The invention claimed is:

1. A method of determining an equivalent single model for a system of parallel systems having a plurality of units with given dynamic equations to feed power to an electrical grid through a point of common coupling, the method comprising:
determining an impact factor of each unit of the plurality of units based on a proportion of a unit dynamic variable increment to the total parallel systems dynamic variable increment, wherein dynamic variables used in the determination of the impact factor of each unit of the plurality of units is selected from a group consisting of current, voltage, power, and mechanical speed; and
determining coefficients of the dynamic variable in the equivalent single model based on a weighted average of dynamic variable coefficients for each unit of the plurality of units based on the dynamic variable impact factor of each unit of the plurality of units as the weighting; wherein the determining of coefficients of the dynamic variable reduces a computational burden of a computer and its memory usage for modeling the system; and
wherein the method determines the equivalent single model for the system of parallel systems having the plurality of units to feed power to the electrical grid through the point of common coupling based on the weighted average of dynamic variable coefficients for each unit of the plurality of units.

2. The method of claim 1 wherein the method produces a static model of the parallel systems.

3. The method of claim 1 wherein the method produces a dynamic model of the parallel systems.

4. The method of claim 3 wherein the parallel systems are a wind farm and features a plurality of wind speed inputs.

5. The method of claim 4 wherein the plurality of wind speed inputs are in a plurality of locations throughout the wind farm.

6. The method of claim 1 wherein the plurality of units are fixed speed units.

7. The method of claim 1 wherein a frequency response technique is employed to determine the impact factor of each unit of the plurality of units.

8. The method of claim 1 wherein the plurality of units feature a plurality of machine parameters.

9. The method of claim 8 further comprising determining an effect of plurality of machine parameters on each unit of the plurality of units.

10. The method of claim 1 wherein a mechanical input of the equivalent unit is the sum of a total mechanical input of all units.

11. The method of claim 1 wherein a mechanical input increment of the equivalent unit is a sum of a total mechanical input increment of all units of the plurality of units in the parallel systems.

12. The method of claim 1 further comprising determining an equivalent collector system model parameter of the parallel systems based on the impact factor and an equilibrium point of each unit of the plurality of units.

13. The method of claim 1 wherein determining an equivalent single unit model parameters of the based on the impact factor of each unit includes first determining an equivalent electrical side of the parallel systems including at least one generator or converter based on associated impact factors, and then determining an equivalent mechanical side of the parallel systems including at least one wind turbine based on the equivalent electrical side and the impact factors.

14. A non-transitory machine readable medium having stored thereon one or more sequences of instructions configured to execute the method of claim 1 based on mechanical inputs, electrical inputs, or a combination thereof.

15. The method of claim 1 wherein the parallel systems are one of wind turbines, parallel converters, photovoltaic farms, or battery banks.

16. A method of modeling a single equivalent system for parallel systems having a plurality of units, the method comprising:
determining an impact factor of each unit proportional to its operating point of the plurality of units;
determining an equivalent single unit model parameters of the overall parallel system based on the impact factor of each unit using a summation of weighted average of the impact factors for each of the plurality of units; and
determining an effective input of the overall parallel system to use as the equivalent input by optimizing the modeling of the equivalent system for the parallel systems to feed power to an electrical grid through a point of common coupling;
wherein the optimizing of the modeling of the equivalent system reduces the computational burden of a computer and its memory usage for modeling the equivalent system; and
wherein the method determines the single equivalent system of the parallel systems having the plurality of units to feed the power to the electrical grid through the point of common coupling based on the weighted average of the dynamics variable coefficients for each unit of the plurality of units.

17. The method of claim 16 wherein the parallel systems include any of wind turbines, parallel converters, photovoltaic farms, battery banks and renewables.

* * * * *